US007986858B2

(12) United States Patent
Matsumoto et al.

(10) Patent No.: US 7,986,858 B2
(45) Date of Patent: Jul. 26, 2011

(54) IMAGE PROCESSING APPARATUS AND IMAGE PROCESSING METHOD

(75) Inventors: Nobuyuki Matsumoto, Inagi (JP); Takashi Ida, Tama-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 839 days.

(21) Appl. No.: 12/026,674

(22) Filed: Feb. 6, 2008

(65) Prior Publication Data

US 2008/0267532 A1 Oct. 30, 2008

(30) Foreign Application Priority Data

Apr. 26, 2007 (JP) ................................. 2007-117107

(51) Int. Cl.
*G06K 9/32* (2006.01)
(52) U.S. Cl. .......................... 382/298; 382/274; 382/300
(58) Field of Classification Search .................. 345/3.3, 345/698; 348/234, 235, 236, 238, 396.1, 348/538, E13.065, E7.012; 358/525; 382/274, 382/298, 300; 386/271; 700/189, 252; 704/265
See application file for complete search history.

(56) References Cited

U.S. PATENT DOCUMENTS

| | | | |
|---|---|---|---|
| 2002/0064229 A1 * | 5/2002 | Nakaya | 375/240.17 |
| 2007/0046785 A1 | 3/2007 | Matsumoto et al. | |
| 2007/0237416 A1 | 10/2007 | Taguchi et al. | |
| 2007/0237425 A1 | 10/2007 | Taguchi et al. | |
| 2007/0257926 A1 * | 11/2007 | Deb | 345/568 |
| 2007/0269137 A1 | 11/2007 | Ida et al. | |
| 2008/0107356 A1 | 5/2008 | Matsumoto et al. | |

FOREIGN PATENT DOCUMENTS

| | | | |
|---|---|---|---|
| JP | 2000-188680 | | 7/2000 |
| JP | 2000188680 A | * | 7/2000 |

OTHER PUBLICATIONS

S. Park, et al, IEEE Signal Processing Magazine, USA, IEEE, May 2003, pp. 21-36, Super-Resolution Image Reconstruction: A Technical Overview.

* cited by examiner

*Primary Examiner* — Gregory F Cunningham
(74) *Attorney, Agent, or Firm* — Turocy & Watson, LLP

(57) ABSTRACT

An image enlarging apparatus includes: a luminance data calculation unit configured to set a reference frame from a video image, and to calculate first luminance data for a high resolution video image; a position calculation unit configured to set target pixels in at least one of frames included in the video image except the reference frame, and to calculate corresponding positions to the target pixels in the reference frame with decimal accuracy; a correction amount calculation unit configured to parallelly calculate correction amounts of the first luminance data for the corresponding positions based on the first luminance data, third luminance data of the target pixels, and the corresponding positions; an addition unit configured to calculate sum of correction amounts from the correction amounts; and a luminance data correction unit configured to correct the first luminance data based on the sum of the correction amounts.

13 Claims, 17 Drawing Sheets

IMAGE PROCESSING APPARATUS AND IMAGE PROCESSING METHOD

CROSS-REFERENCE TO RELATED APPLICATIONS

This application is based upon and claims the benefit of priority from Japanese Patent Application No. 2007-117107, filed Apr. 26, 2007, the entire contents of which are incorporated herein by reference.

BACKGROUND OF THE INVENTION

1. Field

The present invention relates to an image enlarging apparatus and method.

2. Related Art

Televisions or displays with a large number of pixels, i.e., with a high resolution have come into widespread use. When the televisions or displays each display an image, they convert the number of pixels of the image data into the number of pixels of the panel. For performing a high resolution processing, there is known an interpolation method (such as a cubic convolution method or a BiCubic method) in which a filtering processing is carried out with a Sinc function based on the sampling theorem, or a multiframe degradation inverse transformation method which can provide a sharper image than this (see, e.g., JP-A-2000-188680 (kokai), or S. Park, et. al., Super-Resolution Image Reconstruction: A Technical Overview, IEEE Signal Processing Magazine, USA, IEEE, May 2003, p. 21 to 36).

The multiframe inverse transformation method is the following high-resolution processing method. Noticing the fact that the subject imaged in a reference frame (a frame to be increased in resolution) is also imaged in another frame continuous thereto, the motion of the subject is detected with decimal accuracy of equal to or less than the pixel interval. Then, a plurality of sample values shifted microscopically in position with respect to the same local portion of the subject are determined. Thus, the pixel values are sequentially corrected using an interpolation method one for each of a plurality of the sample values.

With a conventional multiframe degradation inverse transformation method, the pixel values are corrected sequentially for each of a plurality of the sample values. Therefore, the correction processing is time consuming, so that unfavorably the high resolution processing cannot be carried out at a high speed.

SUMMARY OF THE INVENTION

According to one embodiment of the present invention, there is provided an image enlarging apparatus including: a luminance data calculation unit configured to set a reference frame from a video image which has a plurality of pixels, and to calculate first luminance data for a high resolution video image by interpolating supplementary luminance data based on second luminance data of the reference frame, the number of pixels of the high resolution video image being larger than the video image; a position calculation unit configured to set target pixels in at least one of frames included in the video image except the reference frame, and to calculate corresponding positions to the target pixels in the reference frame with decimal accuracy; a correction amount calculation unit configured to parallelly calculate correction amounts of the first luminance data for the corresponding positions based on the first luminance data, third luminance data of the target pixels, and the corresponding positions; an addition unit configured to calculate sum of correction amounts from the correction amounts; and a luminance data correction unit configured to correct the first luminance data based on the sum of the correction amounts.

According to another embodiment of the present invention, there is provided an image enlarging method including: setting a reference frame from a video image which has a plurality of pixels; calculating first luminance data for a high resolution video image by interpolating supplementary luminance data based on second luminance data of the reference frame, the number of pixels of the high resolution video image being larger than the video image; setting target pixels in at least one of frames included in the video image except the reference frame; calculating corresponding positions to the target pixels in the reference frame with decimal accuracy; parallelly calculating correction amounts of the first luminance data for the corresponding positions based on the first luminance data, third luminance data of the target pixels, and the corresponding positions; calculating sum of correction amounts from the correction amounts; and correcting the first luminance data based on the sum of the correction amounts.

BRIEF DESCRIPTION OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION OF THE INVENTION

Below, by reference to the accompanying drawings, an image enlarging apparatus and method in accordance with embodiments of the invention will be described in details.

Incidentally, the present invention is not limited to the following embodiments, and may be employed with various choices and strategies. Whereas, in the following description, an image may be referred to as a frame.

Figure 1:
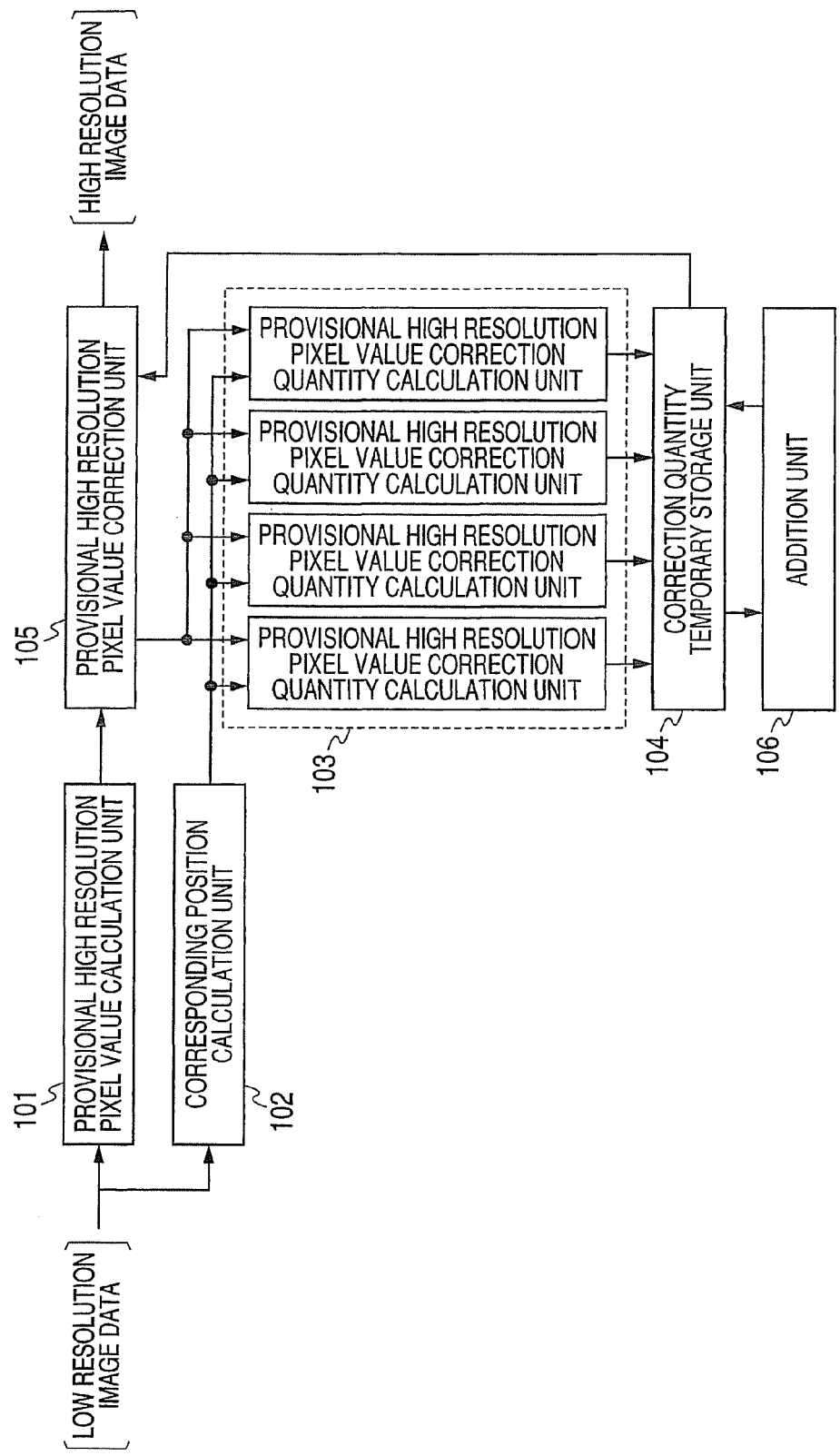
FIG. 1 is a block diagram of an image enlarging apparatus including a plurality of provisional high resolution pixel value correction quantity calculation units in accordance with embodiments.

FIG. 1 is a block view of an image enlarging apparatus in accordance with an embodiment of the invention.

As shown in FIG. 1, the image enlarging apparatus of this embodiment includes a provisional high resolution pixel value calculation unit 101, a corresponding position calculation unit 102, provisional high resolution pixel value correction quantity calculation units 103, a correction quantity temporary storage unit 104, a provisional high resolution pixel value correction unit 105, and an addition unit 106. Incidentally, below, the same elements as the already described apparatus portions are given the same reference numerals, and a description thereon is omitted.

First, the provisional high resolution pixel value calculation unit 101 receives low resolution image data including a plurality of pixels arranged in a screen, and expressing the luminances of these pixels as the pixel values. One frame of the low resolution image data is set as a reference frame. Thus, with an interpolation processing based on the pixel values of the reference frame, the pixel values of the provisional high resolution image data with a larger number of pixels than the number of pixels included in the reference frame are calculated. The calculated provisional high resolution image data is stored in the provisional high resolution pixel value correction unit 105. The low resolution image data may be either a moving image or a still image. Herein, a description will be given assuming that the low resolution image data is, for example, image data photographed by a camera or a cellular phone, image data received by a television or an AV player, or image data stored in a HDD.

Then, the corresponding position calculation unit 102 receives low resolution image data, and successively sets a plurality of pixels in at least one or more frames contained in the low resolution image data as noticed pixels one by one. Then, at least one or more positions of the noticed pixels corresponding to the reference frame (which are hereinafter referred to as the corresponding positions) are calculated with decimal accuracy. Examples of the method of calculation to decimal accuracy may include: a method in which the matching error is determined at the pixel interval of the low resolution image data, and a continuous symmetric function is applied, thereby to determine such a position of decimal accuracy as to minimize the matching error (matching error interpolation method), or a method (oversampling method) in which the low resolution image data is enlarged, and the corresponding positions are determined with the pixel interval in the enlarged image. Alternatively, as another method of calculation with decimal accuracy, it is also possible to physically detect the corresponding positions with decimal accuracy by mounting a gyrocompass on a camera, and measuring the jitter of the camera.

The provisional high resolution pixel value correction quantity calculation units 103 parallelly calculate the correction quantities of the provisional high resolution pixel values corresponding to the corresponding positions from the pixel values of the provisional high-resolution image data stored in the provisional high resolution pixel value correction unit 105, the pixel values of the noticed pixels set at the corresponding position calculation unit 102, and the corresponding positions calculated at the corresponding position calculation unit 102. Herein, there is shown an example in which the calculation is carried out in parallel four pixels by four pixels.

Examples of the method for calculating the correction quantity of the provisional high resolution pixel quantity include a POCS method and an Iterative Back-Projection method (see, S. Park, et. al., Super-Resolution Image Reconstruction: A Technical Overview, p, 29, p. 31, described above).

The correction quantity temporary storage unit 104 stores a plurality of correction quantities corresponding to a plurality of corresponding positions calculated in parallel at the provisional high resolution pixel value correction quantity calculation units 103.

The addition unit 106 adds a plurality of the correction quantities stored in the correction quantity temporary storage unit 104. At this step, the correction quantities corresponding to the same number of pixels as that of the provisional high resolution image data are added. Thus, the added correction quantity for one frame is calculated, and stored in the correction quantity temporary storage unit 104.

Alternatively, the addition unit 106 adds the correction quantities corresponding to the smaller number of pixels than that of the provisional high resolution image data. Thus, the added correction quantity of a portion of one frame is calculated, and stored together with the information of the corresponding position corresponding thereto in the correction quantity temporary storage unit 104.

By adding the correction quantities and temporarily storing the resulting quantity in this manner, it becomes possible to allow the parallel operation of a plurality of the provisional high resolution pixel value correction quantity calculation units 103 involving a large quantity of operation.

The provisional high resolution pixel value correction unit 105 receives the added correction quantity temporarily stored at the correction quantity temporary storage unit 104. Then, it corrects the provisional high resolution pixel value inputted from the provisional high resolution pixel value calculation unit 101 using the added correction quantity.

Below, a plurality of correction quantities of the provisional high resolution pixel value are calculated by the provisional high resolution pixel value correction quantity calculation unit 103. Then, a plurality of the correction quantities of the provisional high resolution pixel values are stored by the correction quantity temporary storage unit 104. A plurality of the provisional high resolution pixel values are added by the addition unit 106. The provisional high resolution pixel value is corrected by using the correction quantity added by the provisional high resolution pixel value correction unit 105. This operation is repeatedly carried out for all the noticed pixels of the low resolution image data successively set.

By doing in this manner, it is possible to output the provisional high resolution image data with having the corrected provisional high resolution pixel values as sharp high resolution image data.

Figure 2:
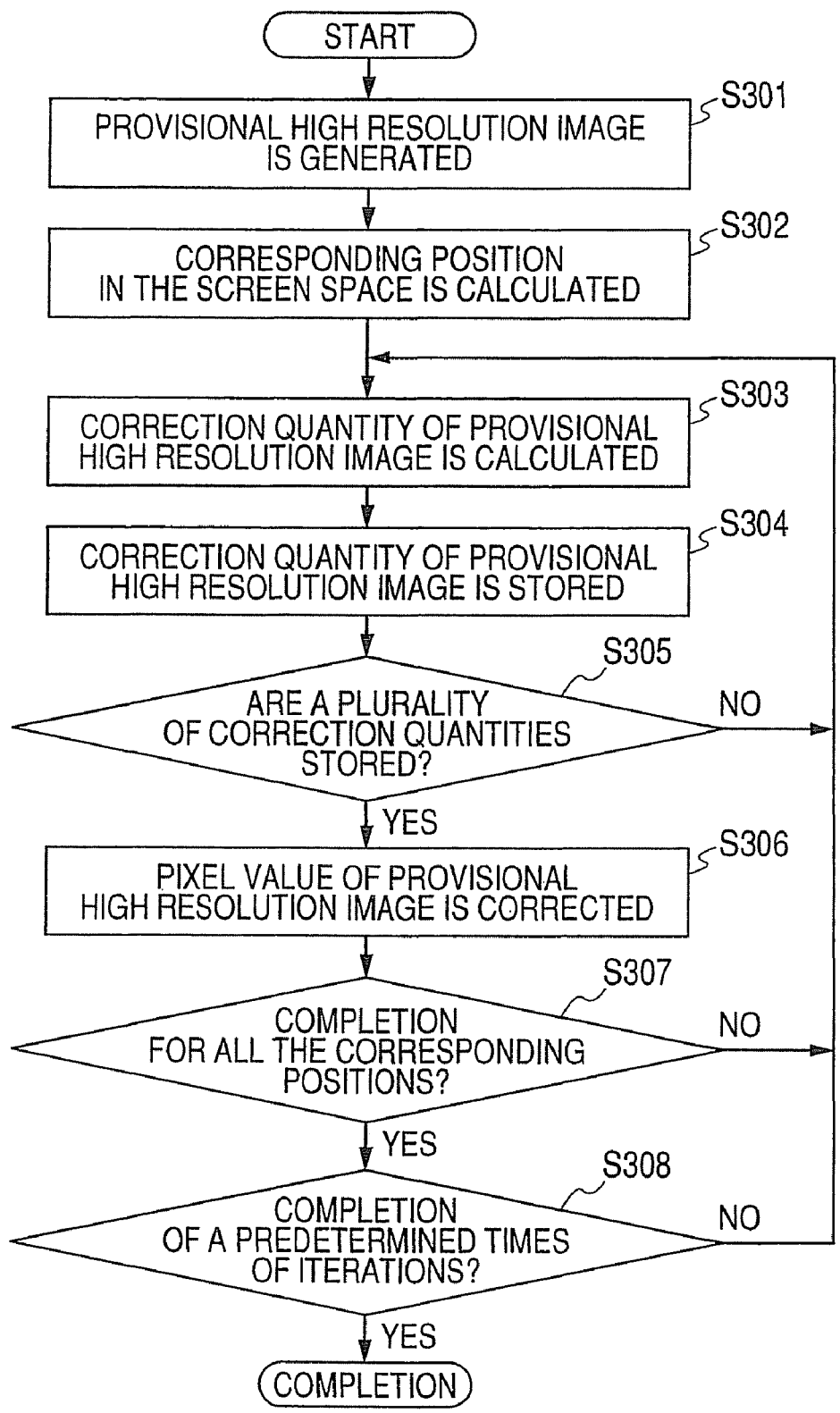
FIG. 2 is a flowchart showing one example of the operation of the image enlarging apparatus of the embodiments.

FIG. 2 is a flowchart for illustrating the operation of outputting high resolution image data from low resolution image data by the image enlarging apparatus described in connection with FIG. 1. Below, a method for forming high resolution image data will be described by reference to FIGS. 2 and 1.

As shown in FIG. 2, first, provisional high resolution image data is generated (Step S301). Specifically, at the provisional high resolution pixel value calculation unit 101 of FIG. 1, out of the low resolution image data including a plurality of pixels arranged in the screen, and expressing the luminances of the pixels as the pixel values, one frame is set as a reference frame. Thus, with an interpolation processing based on the pixel values of the reference frame, the pixel values of the provisional high resolution image with a larger number of pixels than the number of pixels included in the reference frame are calculated.

For the interpolation processing, there can be used an interpolation method by a filtering processing with a Sinc function based on the sampling theorem (a cubic convolution method or a BiCubic method), or the like. The reference frame set from the low resolution image data in this manner is enlarged as a provisional high resolution image.

At this stage, in the provisional high resolution image, the subject in the image is blurred, or the portion which is properly a continuous straight line is expressed in a stepped form referred to as jaggies.

Then, as shown in FIG. 2, the corresponding position in the image space is calculated (Step S302). Specifically, in the corresponding position calculation unit 102 of FIG. 1, a plurality of pixels in at least one or more frames included in the low resolution image data, for example, the edge pixels of the low resolution frame are successively set as a noticed pixel one by one. At least one or more corresponding positions of the noticed pixel in the reference frame are calculated with decimal accuracy.

The calculation processing of the corresponding position with decimal accuracy can be accomplished by a matching error interpolation method based on the low resolution image data, calculation with an oversampling method, or detection by a gyrocompass mounted on a camera.

Then, as shown in FIG. 2, the correction quantities of the provisional high resolution image are calculated by parallel processings (Step S303). Specifically, at the provisional high resolution pixel value correction quantity calculation units 103 of FIG. 1, the correction quantities of the provisional high resolution pixel values are calculated in parallel from the provisional high resolution pixel values stored in the provisional high resolution pixel value correction unit 105, the pixel values of the noticed pixels set at the corresponding position calculation unit 102, and the corresponding positions calculated at the corresponding position calculation unit 102.

For the calculation processing of the correction quantity of the provisional high resolution image, the calculation is carried out by, for example, a POCS method or an Iterative Back-Projection method (see, S. Park, et. al. Super-Resolution Image Reconstruction: A Technical Overview, p. 29 and p. 31, described above).

Then, as shown in FIG. 2, the correction quantity of the provisional high resolution image is stored (Step S304). Specifically, at the correction quantity temporary storage unit 104 of FIG. 1, a plurality of correction quantities corresponding to a plurality of the corresponding positions calculated at the provisional high resolution pixel value correction quantity calculation units 103 are stored. As the correction quantities, a plurality of correction quantities with the same number of pixels as that of the provisional high resolution image data can be stored; the correction sum quantity with the same number of pixels as that of the provisional high resolution image data obtained from the addition of a plurality of the correction quantities in a quantity corresponding to one frame can be stored; and a plurality of correction quantities of the narrow local region in the pixels in the calculated correction position and in the periphery of the corresponding position can be stored. By performing the parallel processings in this manner, it becomes possible to allow the simultaneous operations of a plurality of the provisional high resolution pixel value correction value calculation units 103 involving a large quantity of operation.

Then, in the addition unit 106 of FIG. 1, a plurality of correction quantities stored in the correction quantity temporary storage unit 104 are added as the correction quantity for one frame, and stored in the correction quantity temporary storage unit 104 again.

Then, as shown in FIG. 2, it is determined whether or not a plurality of the correction quantities have been stored (Step S305). Specifically, the correction quantity temporary storage unit 104 of FIG. 1 determines whether or not the correction quantities have been stored for a plurality of the corresponding positions. When the result is NO, the process returns to the step S303, where the correction quantity of the provisional high resolution image for the subsequent corresponding position is calculated. When the result is YES, the process goes to the step S306.

Then, as shown in FIG. 2, the pixel values of the provisional high resolution image are corrected (Step S306). Specifically, at the provisional high resolution pixel value correction unit 105 of FIG. 1, by using the added correction quantity temporarily stored at the correction quantity temporary storage unit 104, the provisional high resolution pixel values stored in the provisional high resolution pixel value correction unit 105 are corrected.

Then, as shown in FIG. 2, it is determined whether or not the processing has been completed for all the corresponding positions of the reference frame (Step S307). Specifically, at the provisional high resolution pixel value correction unit 105, it is determined whether or not the correction processing using all the corresponding positions of the reference frame has been completed. When the result is NO, the process returns to the step S303, where the correction quantity of the provisional high resolution image for the subsequent corresponding position is calculated. When the result is YES, the process goes to the step S308.

Then, as shown in FIG. 2, it is determined whether or not a predetermined number of iterations have been completed (Step S308). Specifically, at the provisional high resolution pixel value correction unit 105 of FIG. 1, it is determined whether or not a predetermined number of iterations of the correction processing using all the corresponding positions have been completed. When the result is NO, the process returns to the step S303, where the correction quantity of the provisional high resolution image is calculated from the first corresponding position again. When the result is YES, the provisional high resolution image is outputted as a high resolution image, and the process is completed.

Below, in order to describe the operation of the corresponding position calculation unit 102 of FIG. 1 in details, first, by reference to FIGS. 3 and 4, a description will be given to the relationship between the low resolution image data and the reference frame.

Figure 3:
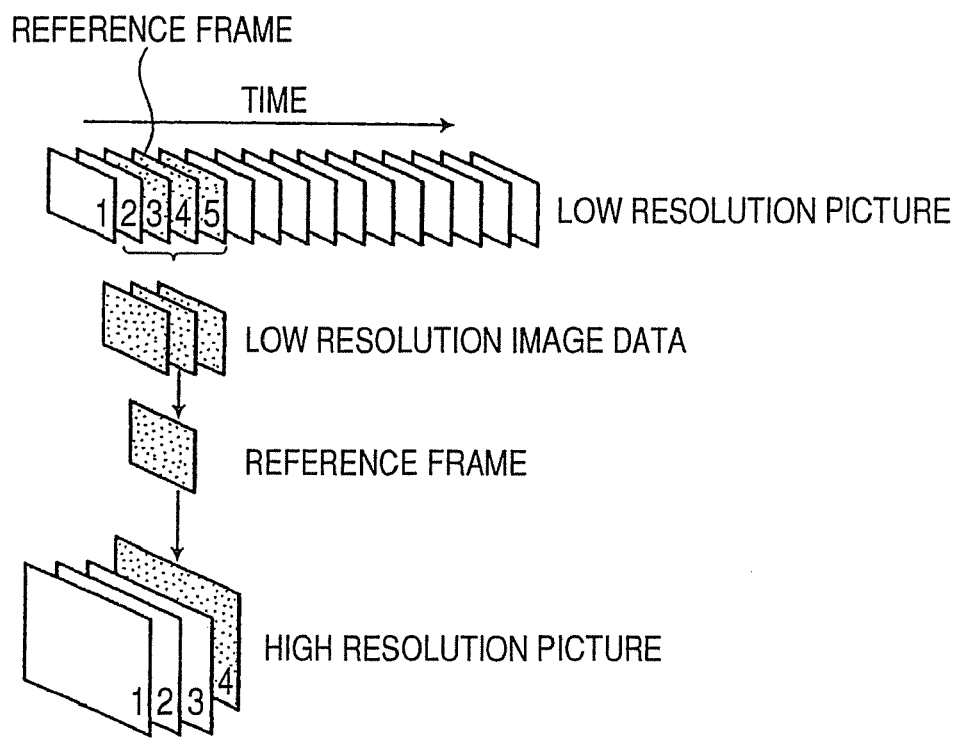
FIG. 3 is a view showing the manner in which a high resolution frame is generated from three low resolution frames.

FIG. 3 illustrates the manner in which a high resolution image is formed in time sequence by using continuous low resolution images (video data).

As shown in FIG. 3, herein, a fourth high resolution image frame is generated. The frame of the low resolution image on which the enlarging processing is being performed at that time, in this example, the fourth frame of the low resolution image, is set as the reference frame. In order to enlarge the reference frame, the enlarging processing is carried out by the use of the reference frame, and the third low resolution image frame and the fifth low resolution image frame at the times before and after that out of the low resolution images. All the low resolution image frames (herein, the third to fifth frames) for use in the enlarging processing are referred to as low resolution image data.

Figure 4:
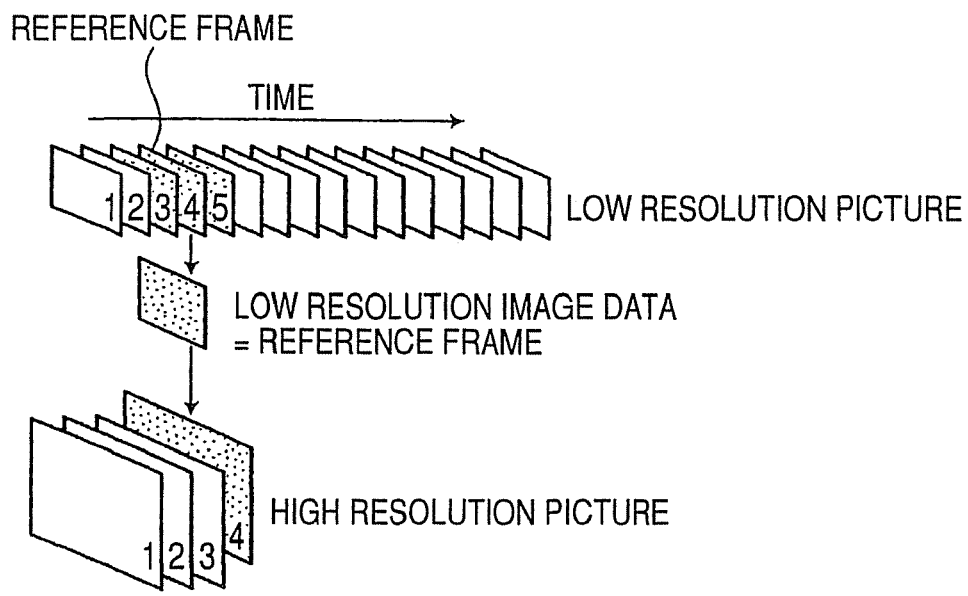
FIG. 4 is a view showing the manner in which a high resolution frame is generated from one low resolution frame.

FIG. 4 shows the state in which an enlarging processing is carried out with only an intra-frame processing by using only the low resolution image frame of the reference frame. Also in the case of a still image, the number of the low resolution image to be inputted is only one. Therefore, this is set as the reference frame, and an enlarging processing is carried out by using only one reference frame. For convenience, the still image is expressed as one frame.

Figure 5:
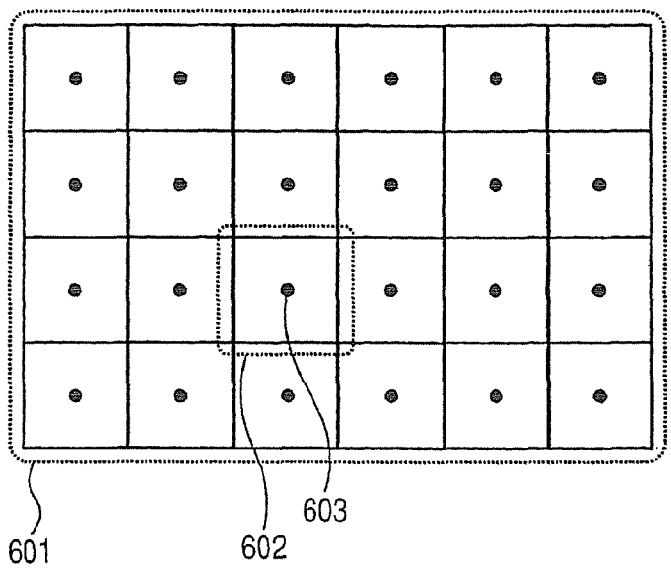
FIG. 5 is a view showing the positional relationship between the screen and the pixels of the low resolution frame.

FIG. 5 is a view showing the positional relationship between a screen 601, a pixel 602, and a sample point 603 of a low resolution image frame.

An image is originally expressed in the form of continuously distributed luminances in the screen space. However, in the case of the digital image data to be herein dealt with, as shown in FIG. 5, pixels are arranged as discrete sample points in the image space, so that the peripheral luminances are typified only by the luminance.

Then, by reference to FIGS. 5 to 8, the relationship between the low resolution image and the high resolution image will be described.

FIG. 5 shows the state in which the screen is divided into 24 squares of 6 rows and 4 columns, and 24 pixels 602 are arranged with the central portions as sample points 603. The typical value of the luminance possessed by each sample point 603 is referred to as a pixel value.

Figure 6:
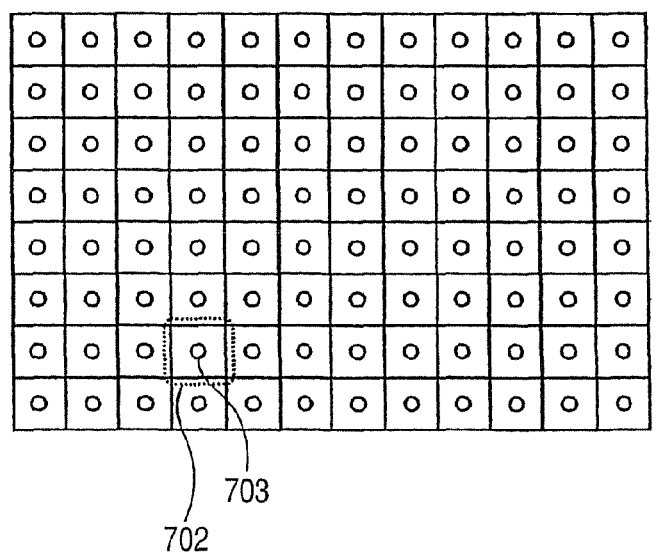
FIG. 6 is a view showing a high resolution frame obtained by enhancing the resolution of the low resolution frame.

FIG. 6 is a view obtained by enhancing the resolution of the screen shown in FIG. 5 to twice laterally and twice longitudinally.

Each sample point 703 of each pixel 702 of the high resolution image frame is indicated with a white circle. Thus, the interval between the sample points 703 of the pixels 702 is half that of the low resolution image frame of FIG. 5.

Figure 7:
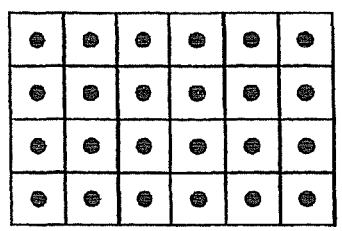
FIG. 7 is a view showing a low resolution frame of which the pixel interval of the image has been matched with the pixel interval.

FIG. 7 is a view showing pixels of the original low resolution image frame at the same spacing as in the high resolution image frame.

In this case, the size of the low resolution image frame is smaller than the size of the high resolution image frame. Thus, when the low resolution image frame is matched in the size of the screen with the high resolution image frame, the interval between the sample points of the pixels increases. Whereas, when the interval between the sample points of the pixels are matched therewith, the size of the screen is reduced. However, these indicate the same fact. Thus, appropriately, the low resolution image frame may be expressed as in FIG. 5, or may be expressed as in FIG. 7.

Figure 8:
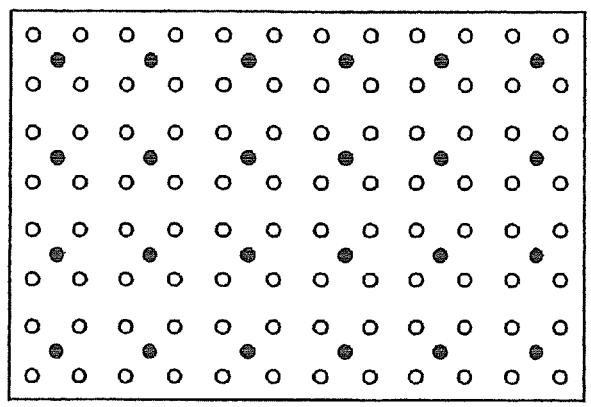
FIG. 8 is a view showing the positional relationship between pixels.

FIG. 8 is a view in which the sample points of the pixels of the low resolution image frame are indicated with black circles, and the sample points of the pixels of the high resolution image frame are indicated with white circles.

As shown in FIG. 8, the enlarging processing, i.e., the processing for implementing high resolution is to determine the pixel values of the white circle sample points based on the pixel values given to the black circle sample points. At that step, by using low resolution image of not only the reference frame selected out of the low resolution image, but also, for example, the temporally preceding and succeeding frames, it is possible to implement sharp high resolution.

Then, the operation of calculating the corresponding position in the image space in the corresponding position calculation unit 102 of FIG. 1 and at the step S302 of FIG. 2 will be described in details by reference to FIGS. 9 to 14.

Figure 9:
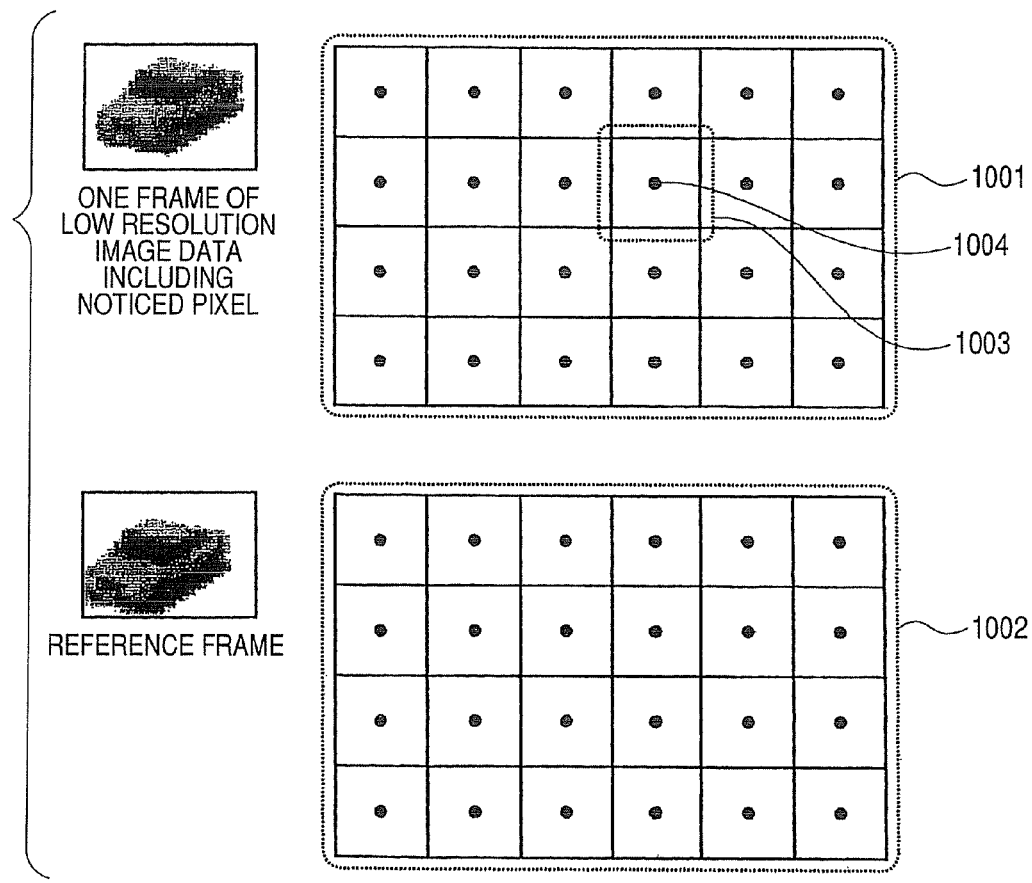
FIG. 9 is a view showing a noticed pixel and a reference frame with calculation of the corresponding position in the screen space.

FIG. 9 is a view showing two temporally successive frames 1001 and 1002 out of the moving images obtained by photographing a moving car.

Herein, a description will be given to the case in which out of the low resolution image frames, the frame 1002 is set as a reference frame for implementing high resolution. At the corresponding position calculation unit 102 of FIG. 1 and the step S302 of FIG. 2, for the noticed pixel 1003 in the low resolution image frame 1001, to what position of the reference frame 1002 the sample point 1004 corresponds is calculated with a finer decimal accuracy than the pixel interval. This position is referred to as a corresponding position. Incidentally, the low resolution image frames 1001 and 1002 are expressed in the form of 24 pixels of laterally 6 pixels by longitudinally 4 pixels as described in connection with FIG. 5 or FIG. 7 for ease of viewing. In actuality, however, for example, the size of the picture of the SD size has the number of pixels of laterally 720 pixels by longitudinally 480 pixels.

By reference to FIGS. 10 to 12, as an example of the operation of the corresponding position calculation unit 102 of FIG. 1 and the step S302 of FIG. 2, a corresponding position calculation method with decimal accuracy using a matching error interpolation method will be described.

Figure 10:
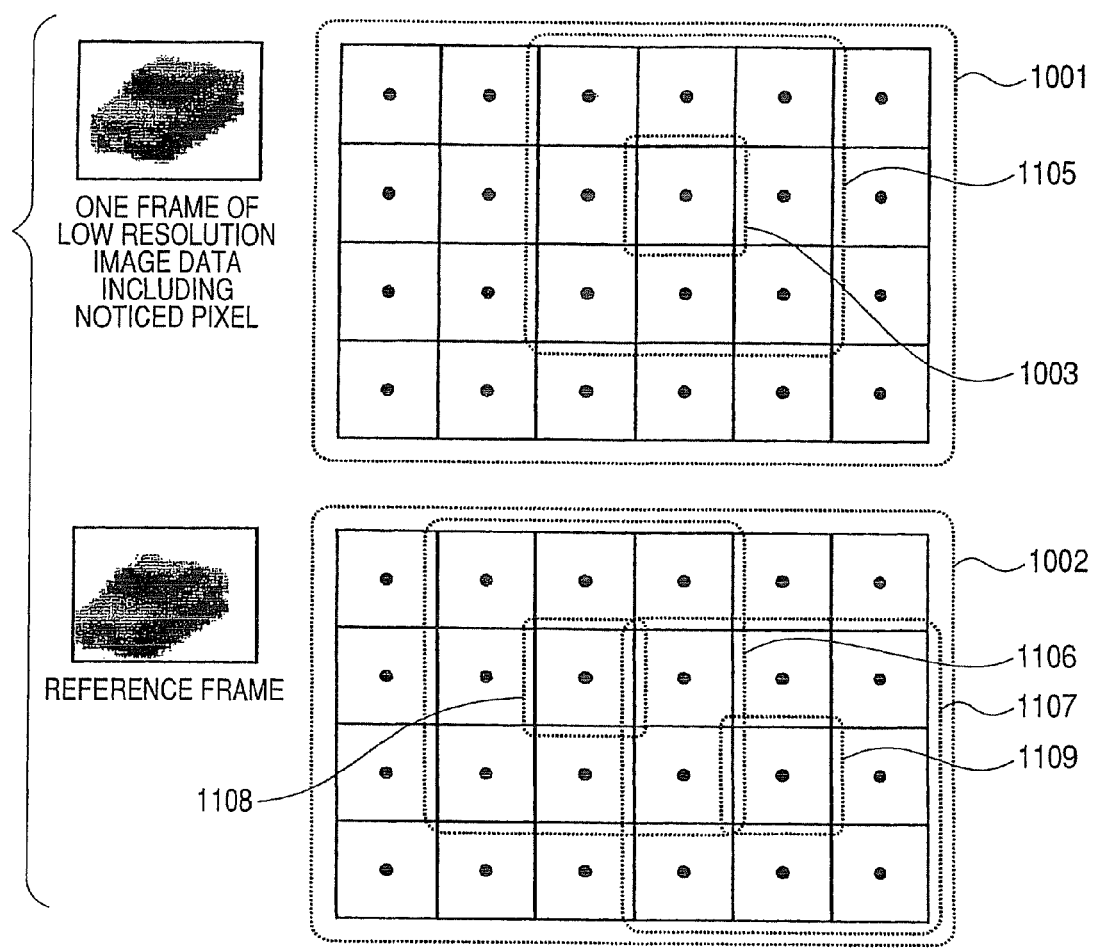
FIG. 10 is a view showing a noticed image region and an image region with calculation of the corresponding position in the screen space.

As shown in FIG. 10, with the matching error interpolation method, first, the matching error between frames from the low resolution image from 1001 to the reference frame 1002 is calculated with accuracy of the pixel interval as with the block matching method.

Then, as shown in FIG. 10, with the noticed pixel 1003 as the center, several pixels in all directions, a rectangular block 1105 of, for example, 5×5 pixels or 3×3 pixels is extracted as a noticed image region from the low resolution image frame 1001.

Then, the portion which is close in the changing pattern of the pixel values to the noticed image region 1105 is searched from the reference frame 1002. As the matching error calculated based on the pixel interval, there can be used SSD (Sum of Square Distance) which is the square sum of differences in each pixel value in the noticed image region between frames, SAD (Sum of Absolute Distance) which is the absolute value sum of differences between respective pixel values, or the like.

Herein, the SAD between the noticed image region 1105 included in the low resolution image frame 1001 and the image region 1106 included in the reference frame 1002 is calculated. Thus, the matching error between the noticed pixel 1003 and the pixel 1108 is calculated. By also calculating the matching error for other pixels of the reference frame 1002 in the same manner, it is possible to calculate the matching error based on the pixel interval. The pixel having the minimum matching error of the respective matching errors becomes the corresponding pixel calculated with the block matching method. This corresponds to the pixel interval, i.e., the corresponding position with integer accuracy.

Figure 11:
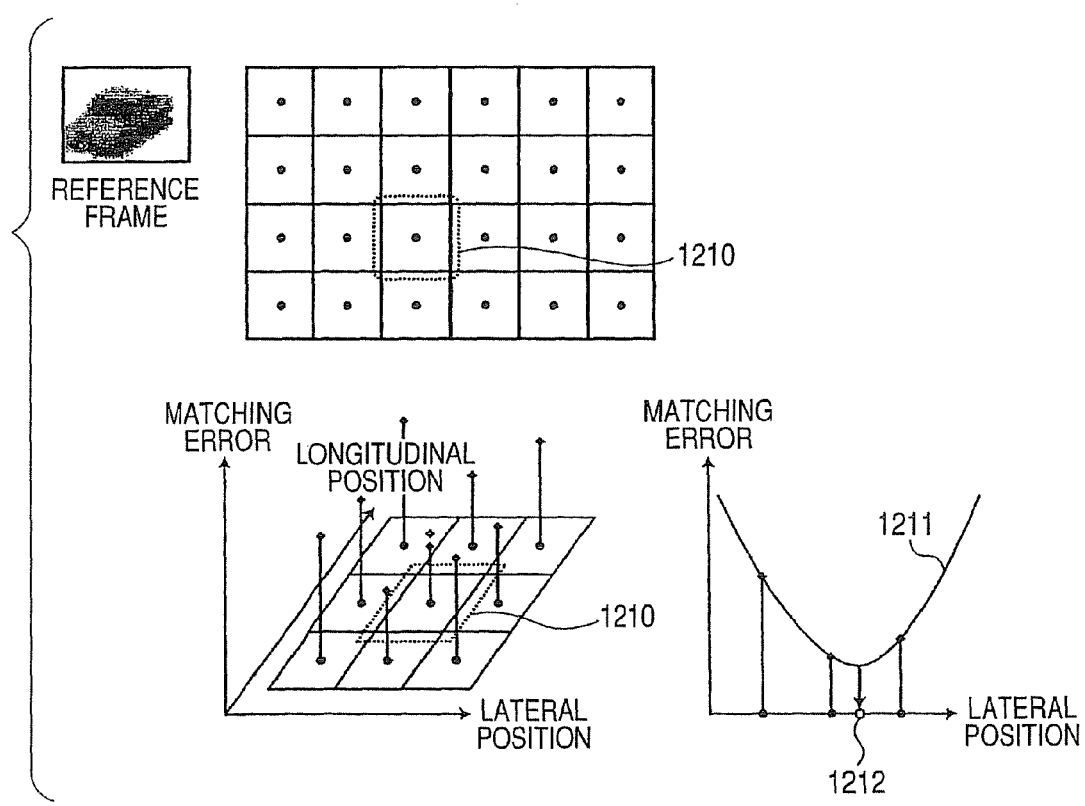
FIG. 11 is a view showing a matching error interpolation method with calculation at the corresponding position in the screen space.

FIG. 11 is a view showing the state in which as the corresponding pixel of the noticed pixel 1003 in the low resolution image frame 1001, the pixel 1210 in the reference frame 1002 has been determined.

The graph shown in FIG. 11 is a graph showing the matching errors for 3×3 pixels around the corresponding pixel 1210, calculated on the respective pixels. It is indicated that the matching error of the noticed pixel 1210 is minimum out of the nine matching errors.

First, the calculation of the corresponding position for the lateral direction will be described. To the matching errors of the corresponding pixel 1210 and the laterally opposite adjacent sides, asymmetric continuous function 1211 is applied. For the symmetric continuous function, a parabola or two straight lines symmetric with respect to the axis of the matching error may be used. The lateral position at which the continuous function thus applied is minimum (indicated with a white circle) is referred to as the corresponding position 1212 with decimal accuracy. Similarly for the longitudinal direction, the longitudinal corresponding position can be calculated. Alternatively, it is also possible to calculate the lateral and longitudinal corresponding positions simultaneously by applying a symmetric curved surface without respectively and separately calculating the lateral and longitudinal corresponding positions.

Figure 12:
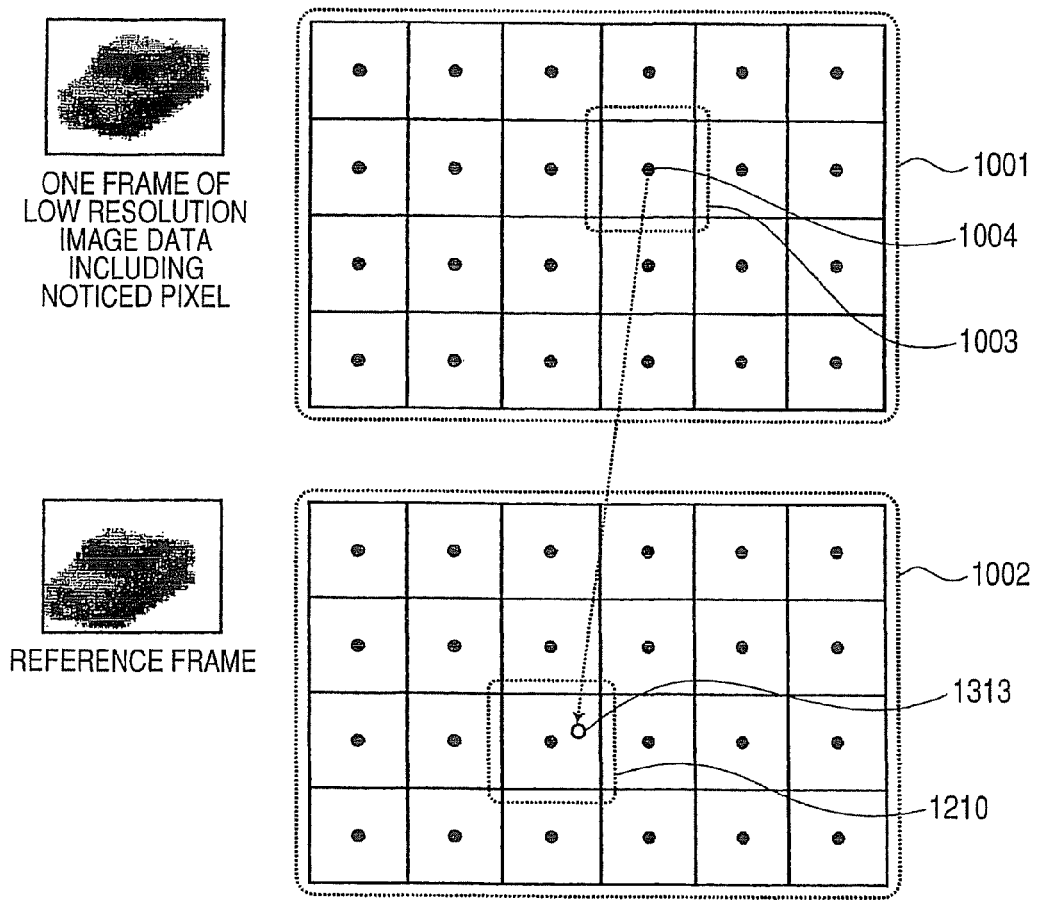
FIG. 12 is a view showing the corresponding position with respect to the reference frame with calculation of the corresponding position in the screen space.

FIG. 12 is a view showing the state in which the corresponding position with decimal accuracy has been calculated by carrying out the foregoing operation.

As shown in FIG. 12, by determining the corresponding pixel 1210 of the reference frame 1002 to which the noticed pixel 1003 of the low resolution frame 1001 out of the two temporally successive low resolution image frame 1001 and reference frame 1002, and applying a continuous function thereto, the corresponding position 1313 of the reference frame 1002 to which the sample point 1004 of the noticed pixel 1003 corresponds is calculated.

Then, by reference to FIGS. 13 and 14, as an example of the operation of the corresponding position calculation unit 102 of FIG. 1 and the step 302 of FIG. 2, a description will be given to a corresponding position calculation method with decimal accuracy using an oversampling method.

Figure 13:
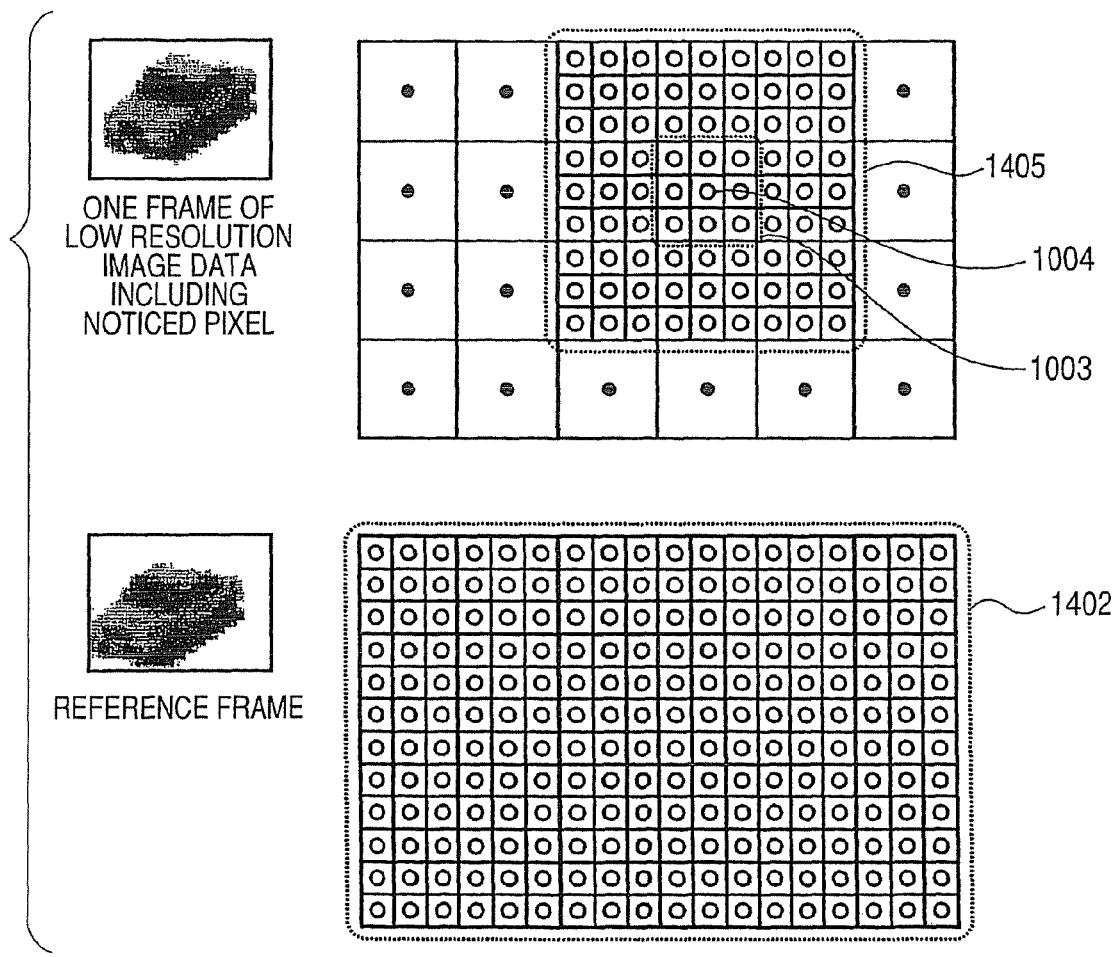
FIG. 13 is a view showing the oversampling method with calculation of the corresponding position in the screen space.

As shown in FIG. 13, with the oversampling method, first, respective pixels of the noticed image region 1105 of the noticed pixel 1003, and the low resolution reference frame 1002 (see, FIG. 9) are enhanced in resolution. Thus, a high resolution noticed image region 1405 and the high resolution reference frame 1402 are formed. For example, by using an interpolation method (a cubic convolution method or a BiCubic method) by a filtering processing with a Sinc function based on the sampling theorem, high resolution can be implemented. Herein, the resolution is enhanced to 3 times laterally and three times longitudinally. Then, in the high resolution noticed image region 1405 and the high resolution reference frame 1402, the corresponding pixels are calculated with accuracy of the pixel interval as with the block matching method, as described in connection with FIG. 10 of the matching error interpolation method. The low resolution frame is enhanced in resolution to 3 times longitudinally and 3 times laterally. In other words, the pixel interval is reduced to one third. Thus, the corresponding pixels are detected.

Therefore, this corresponds to the fact that the corresponding position can be detected with a fine accuracy of one third of the low resolution pixel interval.

Figure 14:
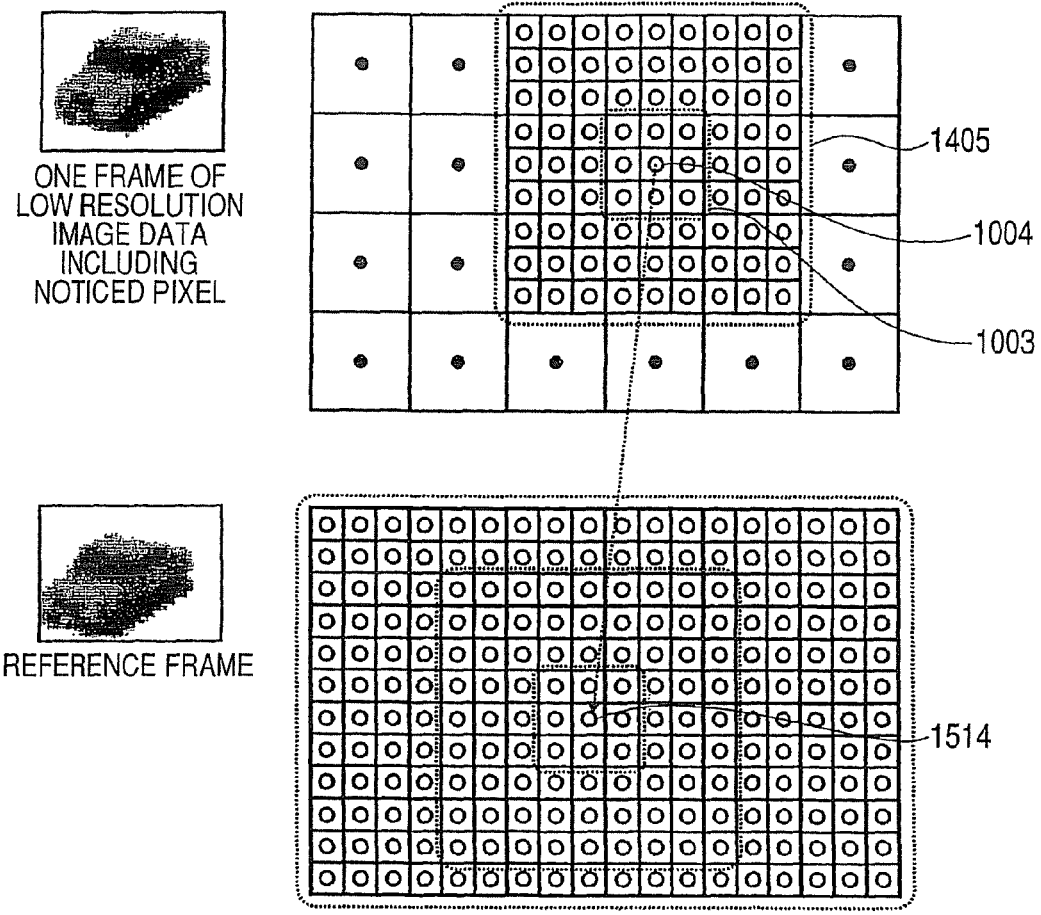
FIG. 14 is a view showing the corresponding pixels oversampled with respect to the reference frame with calculation of the corresponding position in the screen space.

In FIG. 14, specifically, with the oversampling method, the corresponding positions have been detected with decimal accuracy. By the use of the high-resolution noticed image region 1405, the matching errors are calculated on the pixels of the reference frame with a high resolution pixel interval. The sample point 1514 at which the matching error is minimum is calculated as the corresponding position with decimal accuracy of the sample point 1004 of the noticed pixel 1003 in the reference frame.

Then, a description will be given, by way of a specific example, to the calculation of the correction quantity of the provisional high resolution image to be carried out at the provisional high resolution pixel value correction quantity calculation unit 103 of FIG. 1 and the step S303 of FIG. 2.

Figure 15:
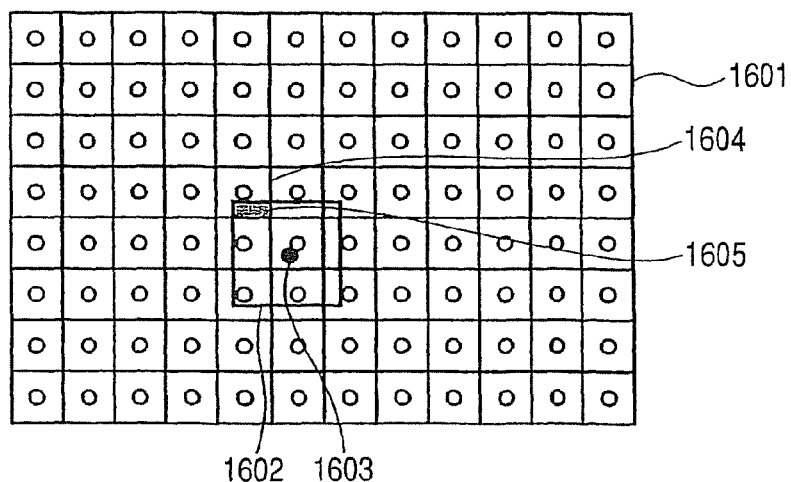
FIG. 15 is a view showing the manner in which the correction quantity of a provisional high resolution image is calculated.

By reference to FIG. 15, the low resolution reference frame 102 of FIG. 9 has been enhanced in resolution to 2 times longitudinally and 2 times laterally at the provisional high resolution pixel value calculation unit 101, and the pixel value of each pixel (white circle) of the provisional high resolution frame 1601 has been determined. Further, at the corresponding position calculation unit 102, the corresponding position 1603 of the noticed pixel 1602 has been calculated as a black circle. In the noticed pixel 1602, the pixel value has already been a photographed proper pixel value in the low resolution frame including the noticed pixel.

First, at the provisional high resolution pixel value calculation unit 101 of FIG. 1 and the step S303 of FIG. 2, in order to evaluate the validity of the pixel value of each pixel (white circle) of the provisional high resolution frame 1601, the pixel value of the noticed pixel 1602 is tentatively calculated from the pixel value of each pixel (white circle) of the provisional high resolution frame 1601. For this, the calculation is carried out based on nine pixels of the provisional high resolution frame 1601 with which the noticed pixel 1602 has an overlap. For example, the weighted mean can be determined according to the area ratio for the trial calculation. For the weight assigned to the pixel 1604 of the provisional high resolution frame relative to the pixel value, the area of the rectangle 1605 when the area of the noticed pixel 1602 is 1 may be used as the weight. The rectangle 1605 is the overlapping portion between the pixel 1604 and the noticed pixel 1602 of the provisional high resolution frame. For the nine rectangles with which the noticed pixel 1602 overlaps, the weighted mean value is determined from the nine pixel values with the overlapping area as the weight. Thus, it is possible to tentatively calculate the pixel value of the noticed pixel 1602 from the pixel values of the pixels (white circles) of the provisional high resolution frame 1601.

When the provisional high resolution frame at this step is accurate, the tentatively calculated pixel value of the noticed pixel 1602 and pixel value of the photographed and correct noticed pixel 1602 should be in agreement with each other. However, generally, with enlargement by a conventional filtering processing at the provisional high resolution pixel value calculation unit 101, the subject in the screen is blurred, or the portion which is properly a continuous straight line is expressed in a stepped form referred to as jaggies. Therefore, these values are not in agreement with each other. Thus, in order for these values to be in agreement with each other, the correction quantity by which the pixel value of the provisional high resolution frame should be corrected is calculated.

For the calculation of the correction quantity, first,

Difference value=(Photographed pixel value of noticed pixel)−(Tentatively calculated pixel value of noticed pixel)

is calculated. When the difference value is distributed with the weight for the tentative calculation, the difference value is 0. A process in which the correction quantity is calculated in this manner is the POCS method (see, S. Park, et. al., Super-Resolution Image Reconstruction: A Technical Overview, p, 29, p. 31, described above). Thus, when the nine correction quantities distributed with the weight are added to the nine pixel values of the provisional high resolution frame 1601, the difference value is 0 for the noticed pixel calculated at that step. Thus, the photographed pixel value of the noticed pixel and the tentatively calculated pixel value are in agreement with each other. However, according to the corresponding position of another noticed pixel, the correction using this may correct the pixel value of the same high resolution frame 1601. Thus, the correction processing is carried out sequentially for all the calculated corresponding positions. Further, this is repeated for a predetermined times. By this iteration, gradually, the provisional high resolution frame is approaching the accurate one. Therefore, the provisional high resolution frame obtained by making the iteration for a predetermined times is outputted as the high resolution frame.

Whereas, the process in which for calculation of the correction quantity, the calculation is not made such that the difference value is 0, but the correction quantity is calculated in such a direction that the difference value decreases (see, S. Park, et. al., Super-Resolution Image Reconstruction: A Technical Overview, p, 29, p. 31, described above).

Then, by reference to FIGS. 16 to 18, a detailed description will be given, by way of a specific example, to the storage of the added correction quantity of the provisional high resolution image added to be carried out at the correction quantity temporary storage unit 104 and the addition unit 106 of FIG. 1, and at the step S304 of FIG. 2.

As for the correction quantity, the correction quantities calculated at the provisional high resolution pixel value correction quantity calculation units 103 can be directly stored as a correction sum quantity obtained by adding a plurality of correction quantities, or can be stored by adding a plurality of the correction quantities of the narrow local region in the pixels at the calculated corresponding position and in the periphery of the corresponding position.

Figure 16:
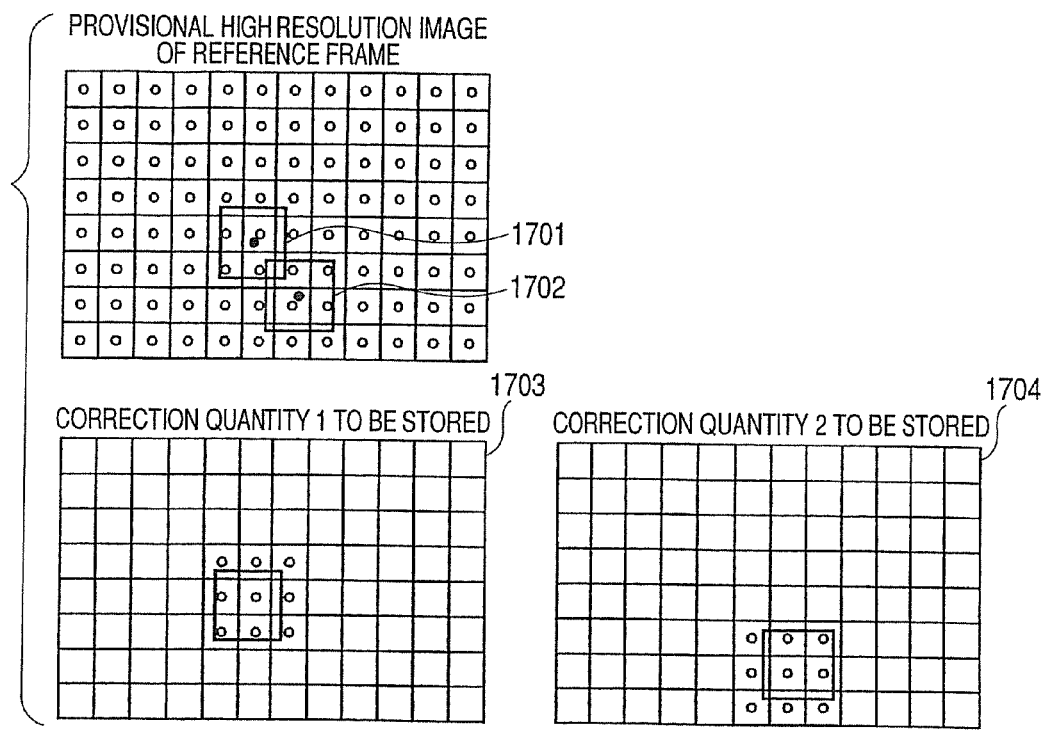
FIG. 16 is a view showing a plurality of correction quantities directly stored.

FIG. 16 is a view showing the correction quantity 1703 calculated from the corresponding position of the noticed pixel 1701 and the correction quantity 1704 calculated from the corresponding position of the noticed pixel 1702. The correction quantity temporary storage unit 104 of FIG. 1 thus stores, for example, two correction quantities simultaneously calculated in parallel processings.

With conventional calculation of the correction quantities, the correction processings are successively carried out for a plurality of the corresponding positions. In other words, the first correction quantity is calculated from the first corresponding position of the first noticed pixel 1701, the first pixel value, and the pixel value of the provisional high resolution frame, and the pixel value of the provisional high-resolution frame is corrected. Subsequently, the second correction quantity is calculated from the second corresponding position of the second noticed pixel 1702, the second pixel value, and the pixel value of the provisional high resolution frame corrected with the first noticed pixel 1701. Then, the provisional high resolution frame corrected with the first noticed pixel 1701 is corrected. The first correction quantity affects the second correction quantity. Therefore, the first correction quantity is determined. Then, the second correction quantity is determined. Accordingly, it is not possible to simultaneously and separately determine the first correction quantity and the second correction quantity with parallel processings.

However, at the step S307 of FIG. 2, it is determined whether the corrections have been made at all the corresponding positions. Like this, regeneration processings are sequentially carried out from the frames photographed at different times out of the low resolution image data to the provisional high resolution image. Further, at the step S308, it is determined whether or not the correction processing using all the correction positions have been repeated for a predetermined times and have been completed. Like this, the regeneration processings are sequentially carried out for a predetermined times. The sufficient sequential processings are carried out. Thus, it is possible to implement a sharp and high resolution even without successively carrying out the correction processings for all the corresponding positions.

Further, a part of correction quantities are calculated in parallel, and the provisional high resolution frame is corrected with a plurality of the stored correction quantities. As a result, it is possible to generate a sharp high resolution frame at a high speed.

Figure 17:
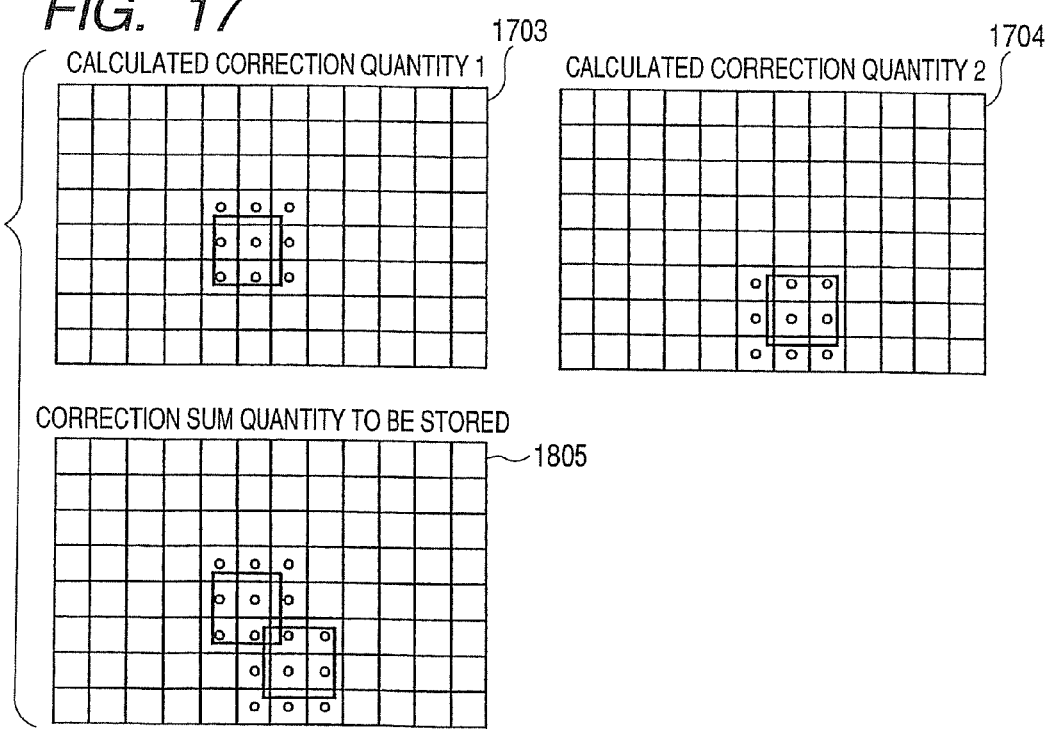
FIG. 17 is a view showing a correction sum quantity resulting from addition of a plurality of the correction quantities.

Whereas, as shown in FIG. 17, the correction quantity temporary storage unit 104 of FIG. 1 stores the correction sum quantity obtained by adding a plurality of correction quantities. The correction quantity 1703 calculated from the corresponding position of the noticed pixel 1701 and the correction quantity 1704 calculated from the corresponding position of the noticed pixel 1702 partly overlap each other. However, the correction quantities of all the pixels are added to calculate the correction sum quantity 1805. As a result of this, one frame of memory for storing the correction quantity is enough.

Figure 18:
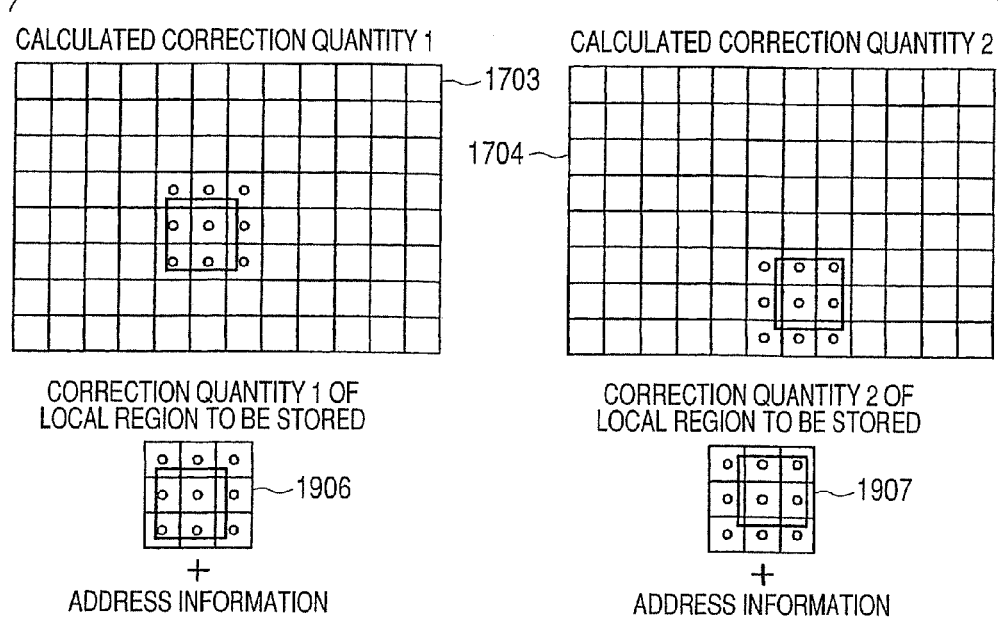
FIG. 18 is a view showing a plurality of correction quantities of local regions.

Whereas, as shown in FIG. 18, the correction quantity temporary storage unit 104 of FIG. 1 may store a plurality of correction quantities in the narrow local region in the pixels at the calculated corresponding position and around the corresponding position. The correction quantity 1703 calculated from the noticed pixel 1701 and the correction quantity 1704 calculated from the corresponding position of the noticed pixel 1702 each include nine correction quantities. Therefore, the memories 1906 and 1907 each storing nine correction quantities, and the information such as the address information (in FIG. 19, the address information (the fifth pixel in the lateral direction, the fourth pixel in the longitudinal direction) of the first correction quantity, and the address information (the sixth pixel in the lateral direction, the sixth pixel in the longitudinal direction) of the second correction quantity of the upper left correction quantity in the provisional high resolution frame are calculated in parallel, and stored in the correction quantity temporary storage unit 104. As a result of this, it is possible to further reduce the size of the memory storing the correction quantities.

Then, a description will be given, by way of a specific example, to the operation of correcting the pixel values of the provisional high resolution image to be carried out at the provisional high resolution pixel value correction unit 105 of FIG. 1, and in the step S306 of FIG. 2.

The provisional high resolution pixel value correction unit 105 corrects the provisional high resolution pixel value calculated at the provisional high resolution pixel value calculation unit 101 with the correction quantities temporarily stored at the correction quantity temporary storage unit 104 and stored at the provisional high resolution image value correction unit 105.

When the correction quantity temporary storage unit 104 stores directly a plurality of calculated correction quantities as shown in FIG. 16, to the pixel value of the provisional high resolution frame, first, the first correction quantity 1703 is added, and then, the second correction quantity 1704 is added. Thus, the provisional high resolution pixel value is corrected.

Whereas, when the correction quantity temporary storage unit 104 stores the correction sum quantity 1805 obtained by adding a plurality of correction quantities as shown in FIG. 17, it is essential only that the correction sum quantity 1805 is added to the pixel value of the provisional high resolution frame once.

Whereas, when the correction quantity temporary storage unit 104 stores a plurality of correction quantities of the narrow local region in the pixels in the calculated corresponding position and in the periphery of the corresponding position, to the pixel value of the provisional high resolution frame, first, the correction quantity 1906 of the first local region is added, and then, the correction quantity 1907 of the second local region is added. Thus, the provisional high resolution pixel value is corrected.

Then, by reference to FIGS. 19 and 20, a description will be given to the case where the self-congruity in the frame of the subject (in the reference frame) is utilized as the operation of calculating the corresponding position in the image space at the corresponding position calculation unit 102 of FIG. 1 and in the step S302 of FIG. 2. This is applicable to the case where there are no continuous preceding and succeeding frames as in the moving picture, such as a still picture.

Figure 19:
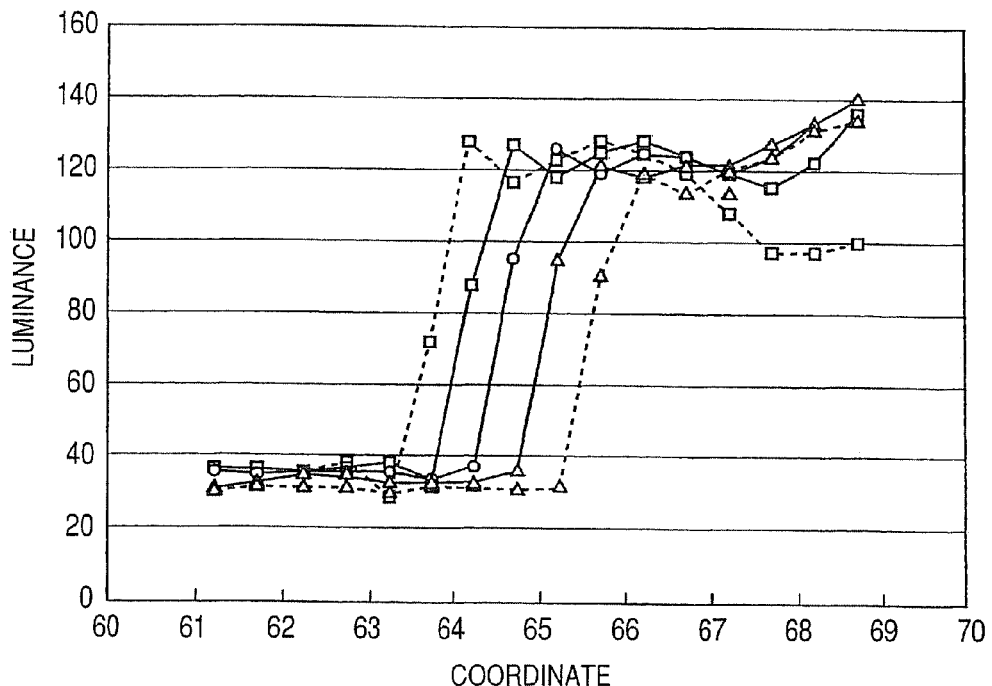
FIG. 19 is a view showing the self-congruity of the local pattern.

FIG. 19 is a view showing actual digital image data with the abscissa of the pixel on the horizontal axis and the pixel value indicating the luminance on the vertical axis. Herein, different five rows of data in the same frame are respectively indicated with different zigzag lines.

As shown in FIG. 19, it is indicated that even different rows in the same frame have portions exhibiting very similar changes in luminance. Such a property of an image having similar changes in luminance in the same frame is defined as the self-congruity. The position having the self-congruity present around a noticed pixel is defined as the self-congruity position.

With the processing of implementing high resolution using the self-congruity in the frame of the subject, a plurality of continuous low resolution image data are not required to be stored in a memory. Thus, there is an advantage in that it is possible to implement high resolution with a small memory capacity.

Implementation of high resolution using the self-congruity for the deterioration inverse transformation method of the intra-frame processing can be accomplished in the following manner. At the step S302, the corresponding position calculation unit 102 sets the image data formed of one frame of a still picture as the reference frame. A plurality of pixels in the reference frame, for example, the edge pixels in the reference frame are successively set as the noticed pixels one by one. Thus, one or more corresponding positions of the noticed pixels with respect to the periphery thereof are calculated with decimal accuracy. Alternatively, the self-congruity is applied to the matching error interpolation method or the oversampling method based on the low resolution image data. As a result, one or more corresponding positions of the noticed pixels with respect to the periphery thereof can be calculated with decimal accuracy.

Figure 20:
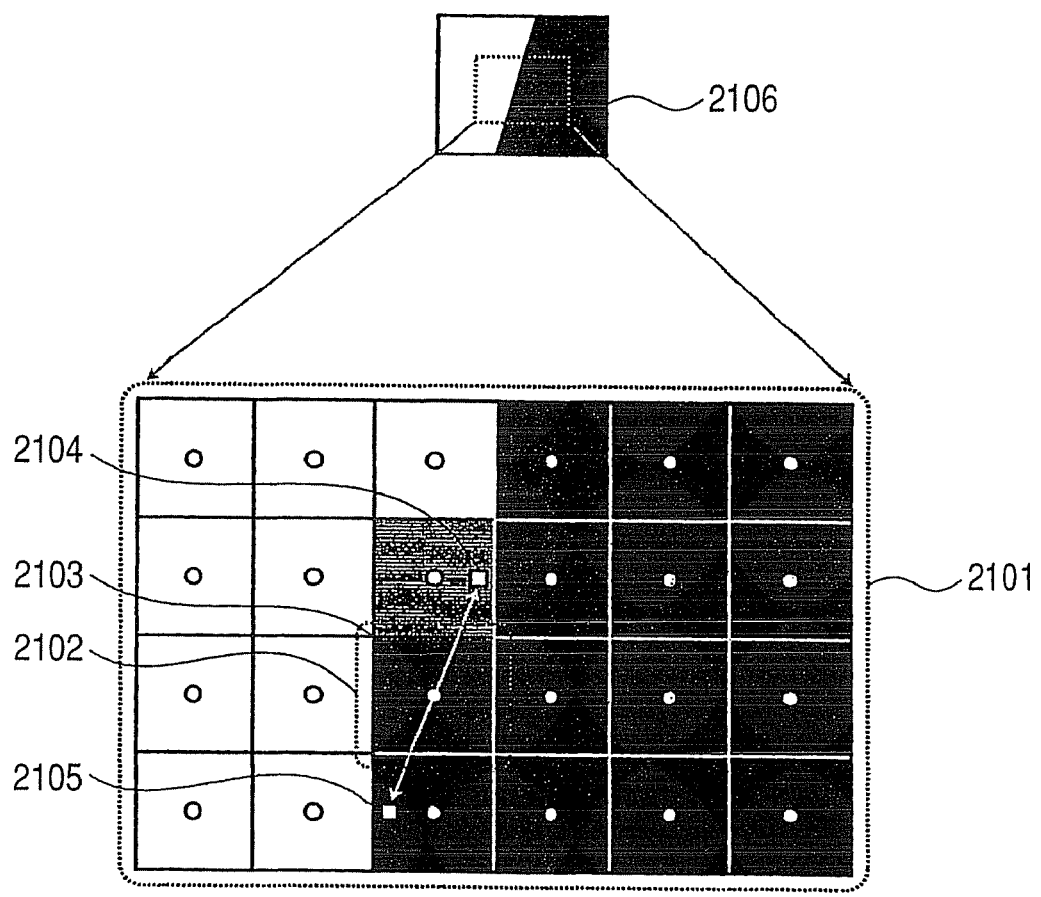
FIG. 20 is a view showing the manner in which the self-congruity position in the screen space is calculated.

FIG. 20 is a view for illustrating an example in which the low resolution reference frame 2101 of a subject 2106 having longitudinal edges is enhanced in resolution using the self-congruity.

As shown in FIG. 20, the noticed pixel is set at 2102, and the sample point is set at 2103. At the step S302 of FIG. 2, the self-congruity positions present around the sample point 2103 are calculated. Assuming that the self-congruity position is present one line over or one line under that, the self-congruity position with decimal accuracy is determined with the matching error interpolation method or the oversampling method. The results thereof are the first self-congruity position 2104 and the second self-congruity position 2105.

The noticed pixel, the pixel value of the noticed pixel, and the corresponding position with decimal accuracy of the noticed pixel in the reference frame (herein, the self-congruity position) are calculated in this manner. As a result, from this point forward, the calculation of the correction quantities of the provisional high resolution image by the step S303, the storage of the correction quantities of the provisional high resolution image by the step S304, and the correction of the provisional high resolution pixel value of FIG. 2 are carried out. As a result, a sharp high resolution image can be implemented at a high speed.

Figure 21:
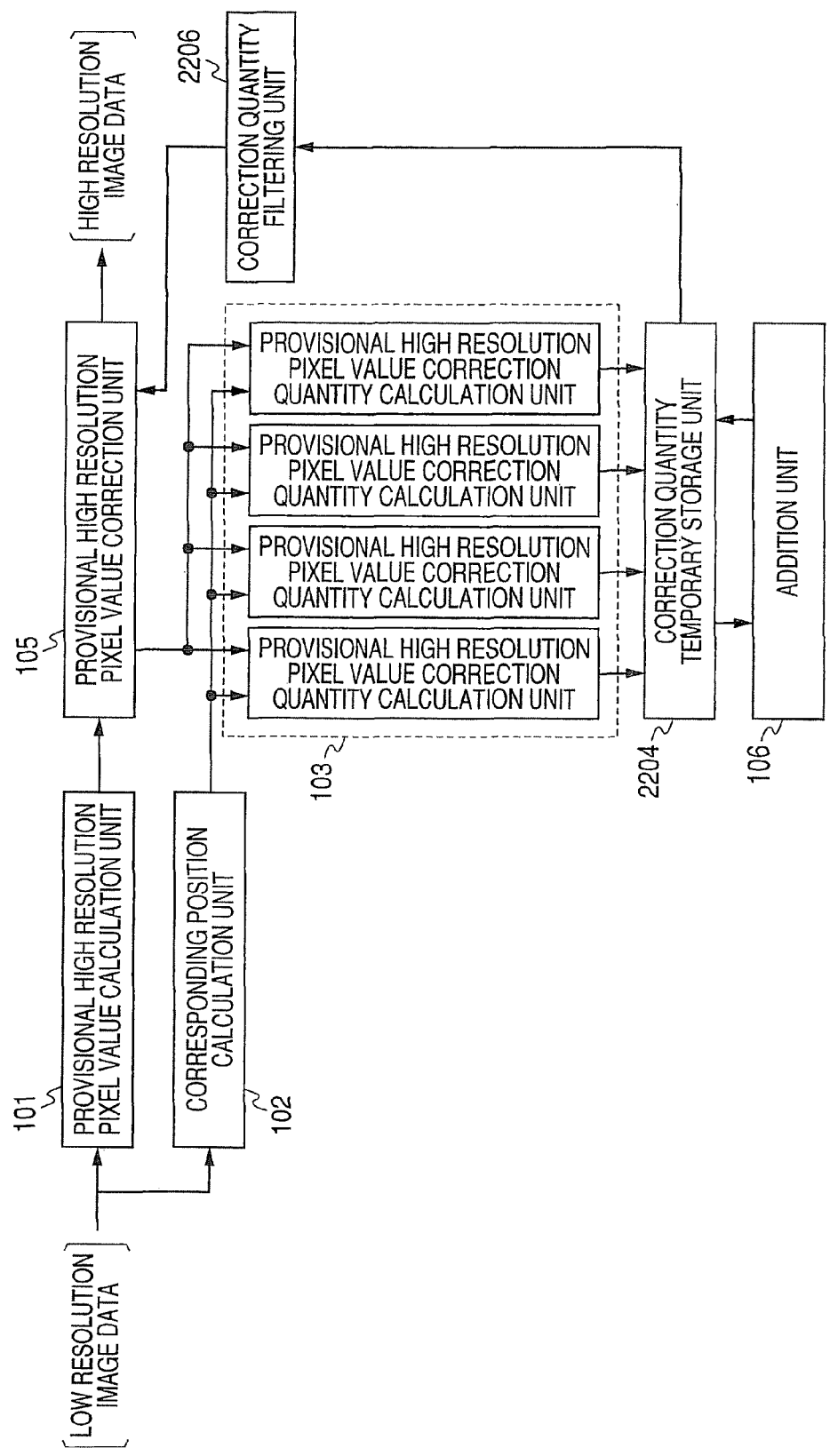
FIG. 21 is a block diagram of an image enlarging apparatus in accordance with another embodiment.

FIG. 21 is a block diagram of an image enlarging apparatus in accordance with another embodiment of the invention. The image enlarging apparatus includes a correction quantity filtering unit 2206 interposed between a correction quantity temporary storage unit 2204 and a provisional high resolution pixel value correction unit 105. As a result, it can perform a filtering processing on the added correction quantity to remove a noise referred to as an artifact noise inherent in the deterioration inverse transformation method. Other configuration is the same as that of the image enlarging apparatus described in connection with FIG. 1. Therefore, the same elements are given the same reference signs and numerals, and a description thereon is omitted.

With a multi-frame deterioration inverse transformation method or an intra-frame deterioration inverse transformation method, there may occur a noise referred to as a checked artifact noise which is an inherent phenomenon occurring with the deterioration inverse transformation method.

As shown in FIG. 21, the image enlarging apparatus includes the correction quantity filtering unit 2206 interposed between the correction quantity temporary storage unit 2204 and the provisional high resolution pixel value correction unit 105. As a result, it performs a filtering processing on the added correction quantity to remove an impulse type correction quantity from the added correction quantity. As a result, it becomes possible to implement a sharp high image quality while removing an artifact noise.

Specifically, as shown in FIG. 21, the correction quantity temporary storage unit 2204 stores the correction quantity obtained by adding a plurality of correction quantities corresponding to a plurality of corresponding positions calculated at the provisional high resolution pixel value correction quantity calculation units 103.

The correction quantity filtering unit 2206 removes an impulse type correction quantity from the added correction quantity. For example, a spatial median filter is used. This is for removing an artifact noise of the high resolution frame using the spatial distribution of the correction quantities.

Figure 22:
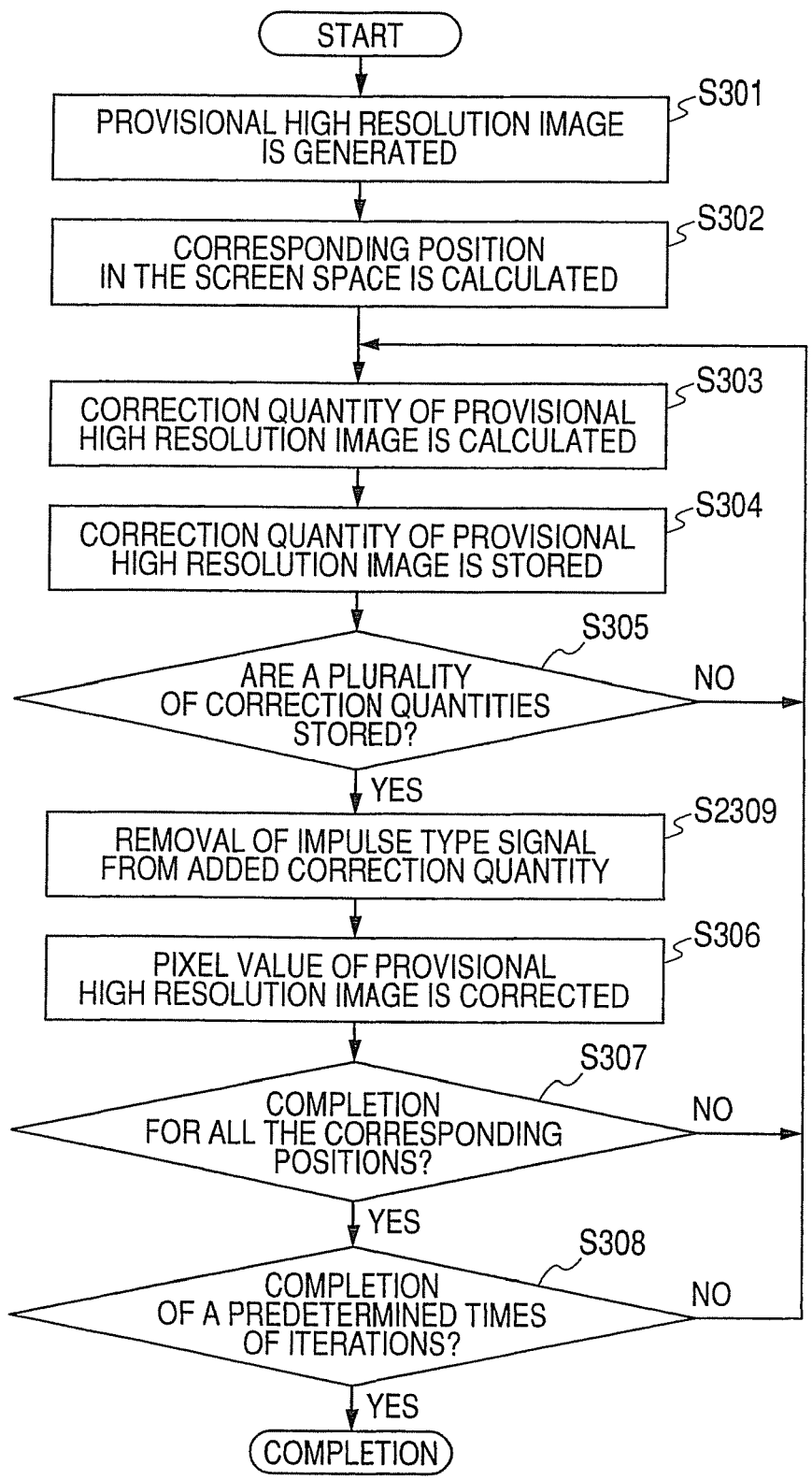
FIG. 22 is a flowchart showing one example of the operation of the image enlarging apparatus in accordance with the another embodiment.

FIG. 22 is a flowchart illustrating the operation of the image enlarging apparatus of FIG. 21. It is different from the flowchart of FIG. 2 in that a step of removing an impulse type signal from the added correction quantity is inserted between the step S305 and the step S306. Other steps are the same as in the flowchart of FIG. 2, and are given the same reference signs and numerals, and a description thereon is omitted.

At the step S2309, the correction quantity filtering unit 2206 of FIG. 21 removes an impulse type correction quantity from the added correction quantity stored in the correction quantity temporary storage unit 104 by a median filter or the like. As a result of this, such a correction quantity as to cause an artifact noise is removed. Thus, it is possible to implement sharp high resolution in the correction of the provisional high resolution image at the step S306.

Figure 23:
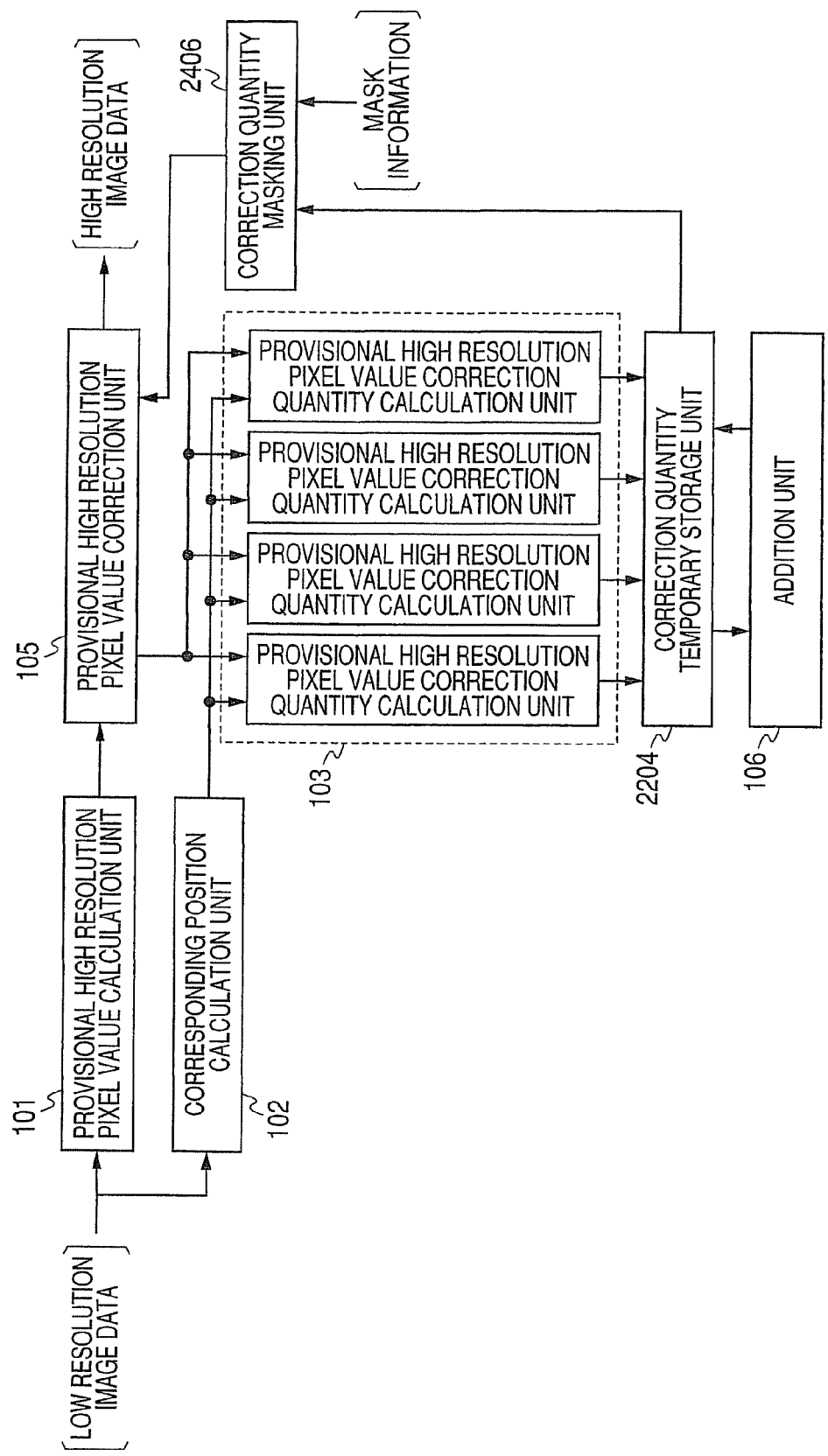
FIG. 23 is a block diagram of the image enlarging apparatus in accordance with a still other embodiment.

FIG. 23 is a block diagram of the image enlarging apparatus in accordance with another embodiment of the invention. The image enlarging apparatus includes a correction quantity masking unit 2406 interposed between the correction quantity temporary storage unit 2204 and the provisional high resolution pixel value correction unit 105. Thus, it performs a masking processing based on the mask information on the added correction quantity. Other configuration is the same as that of the image enlarging apparatus described in connection with FIG. 1. Therefore, the same elements are given the same reference signs and numerals, and a description thereon is omitted.

With the multi-frame deterioration inverse transformation method or the intra-frame deterioration inverse transformation, it is uncertain where the corresponding position indicates. Therefore, it is not possible to make the following assignment. For example, only a portion of the image data is desired to be enhanced in resolution in advance. As for scanned document data including photographs and characters mixed therein, there are the following needs: the character region is desired to be enhanced in resolution, but the photograph region such as a color dither unit is not desired to be enhanced in resolution.

With the image enlarging apparatus shown in FIG. 23, the correction quantity resulting from addition of a plurality of correction quantities is subjected to a masking processing, so that the correction processings are all carried out in parallel. This enables the enhancement of the sharpness and image quality of only a part of the image data.

Specifically, as shown in FIG. 23, the correction quantity masking unit 2406 performs a masking processing on the added correction quantity based on the mask information from the outside. Thus, a part of the added correction quantity is forcedly set at 0.

Figure 24:
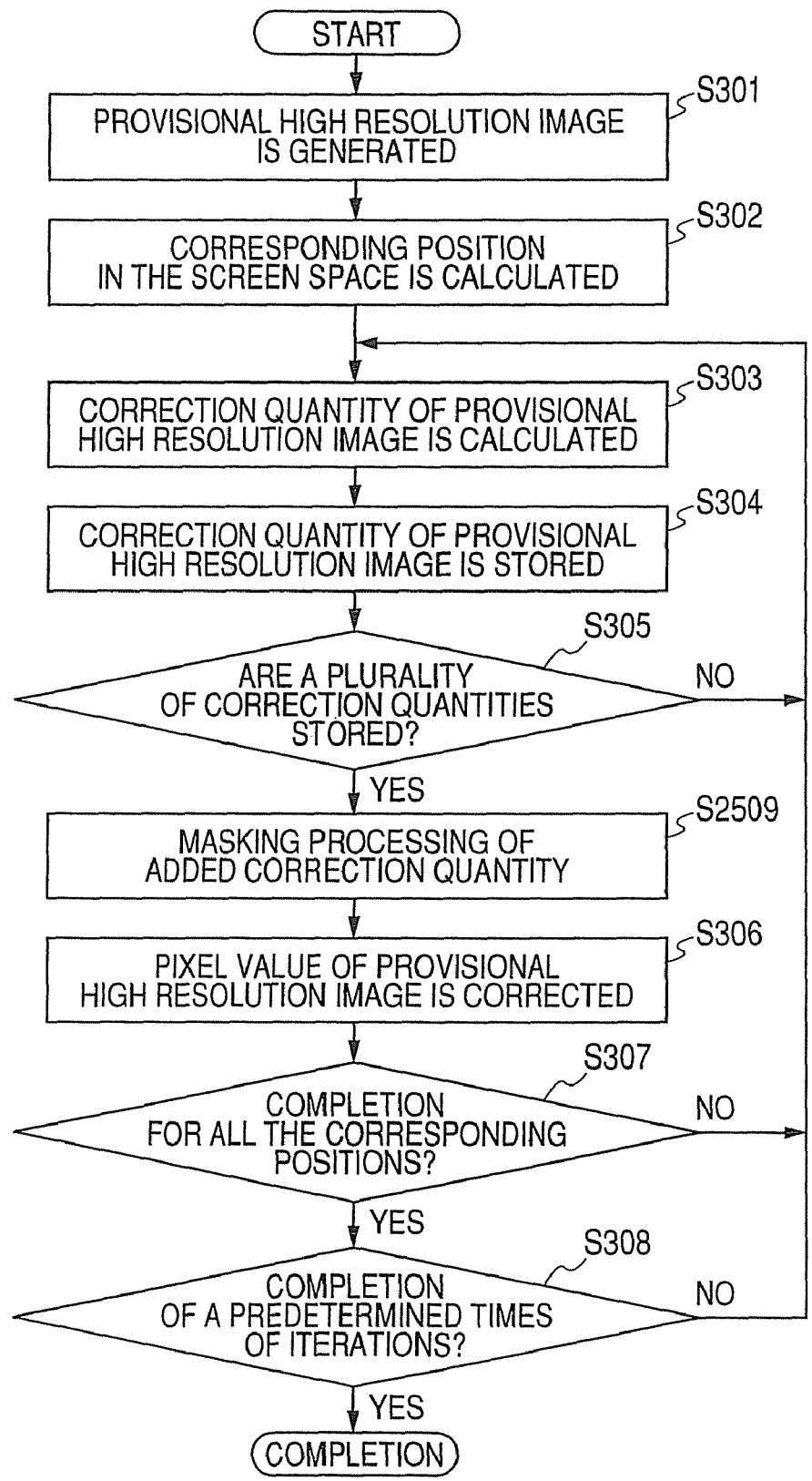
FIG. 24 is a flowchart showing one example of the operation of the image enlarging apparatus in accordance with the other embodiment of the invention.

FIG. 24 is a flowchart for illustrating the operation of the image enlarging apparatus of FIG. 23. It is different from the flowchart of FIG. 2 in that a step of performing a masking processing on the added correction quantity based on the masking information is inserted between the step S305 and the step S306. Other steps are the same as in the flowchart of FIG. 2, and are given the same reference signs and numerals, and a description thereon is omitted.

As shown in FIG. 24, at a step S2509, the correction quantity masking unit 2406 of FIG. 23 performs a masking processing on the added correction quantity stored in the correction quantity temporary storage unit 104 based on the mask information to cut out a part of the added correction quantity. This enables the enhancement in resolution based on the information (mask information) of a region which is desired to be enhanced in resolution and a region which is not desired to be enhanced in resolution.

With the image enlarging apparatus in accordance with the invention, the mean of differences of pixel values per pixel at a 8-bit image (image value 0 to 255) (RMS: Root Mean Square error) is smaller than 1 and is 0.5729. The ratio of differences of the pixel values per pixel (RMS/255) is 0.2247 [%]. This is 52.969 [dB] in PSNR, which corresponds to very high PSNR.

Further, with the image enlarging apparatus in accordance with the invention, a part of correction quantities are calculated in parallel, and the provisional high resolution frame is corrected with a plurality of the stored correction quantities. As a result, it is possible to generate a sharp high-resolution frame at a high-speed. The apparatus is suitable for the case where a recent CPU capable of parallel operations or the like is used.

Whereas, particularly, when a processing is carried out in the frame, the enhancement in resolution is carried out using the self-congruity in the frame of the subject. Therefore, it is not necessary to store a plurality of low resolution image data in a memory. Thus, it is possible to carry out the enhancement of the resolution at a higher speed due to parallel processings, and in addition, with a less memory capacity.

Whereas, when an impulse type correction quantity is removed from the added correction quantity resulting from addition of a plurality of correction quantities, it is possible to remove a checked artifact noise inherent in the deterioration inverse transformation method. This enables the enhancement of the resolution resulting in a sharp and high image quality.

When a masking processing is performed on the added correction quantity resulting from addition of a plurality of correction quantities, the correction processings are all performed in parallel. This enables the implementation of a sharp and high image quality of only a portion of the image data.

Incidentally, the invention is not limited to the embodiments as they are, and the invention may be implemented while respective constituent elements are modified without departing from the scope of the invention. Whereas, various inventions may be made by a proper combination of a plurality of constituent elements disclosed in the embodiments. For example, some constituent elements may be removed from all the constituent elements shown in the embodiments. Further, constituent elements over different embodiments may also be combined.

As described with reference to the embodiment, there is provided an image enlarging apparatus and method capable of parallel execution of correction processing. Thus, it is possible to perform a high-resolution processing at a high speed.

What is claimed is:

1. An image enlarging apparatus comprising:
a luminance data calculation unit configured to set a reference frame from a video image which has a plurality of pixels, and to calculate first luminance data for a high resolution video image, the high resolution video image obtained by interpolating supplementary luminance data into the reference frame having second luminance data, the number of pixels of the high resolution video image being larger than the video image;
a position calculation unit configured to set target pixels in at least one of frames included in the video image except the reference frame, and to calculate corresponding positions to the target pixels in the reference frame with decimal accuracy;
a correction amount calculation unit configured to calculate correction amounts of the first luminance data for the corresponding positions based on the first luminance data, third luminance data of the target pixels, and the corresponding positions, the correction amounts being parallelly calculated for the respective corresponding positions;

an addition unit configured to calculate sum of correction amounts from the correction amounts; and a luminance data correction unit configured to correct the first luminance data based on the sum of the correction amounts.

2. The apparatus according to claim 1, wherein the additional unit calculates the sum of the correction amounts in the entire of the reference frame.

3. The apparatus according to claim 1, wherein the additional unit calculates the sum of the correction amounts in a partial area that is obtained by dividing the reference frame.

4. The apparatus according to claim 1, wherein the luminance data calculation unit selects an image data as the reference frame.

5. The apparatus according to claim 1, further comprising a filtering unit configured to calculate filtered sum of the correction amounts by removing a predetermined component from the sum of the correction amounts, wherein the luminance data correction unit corrects the first luminance data based on the filtered sum of the correction amounts.

6. The apparatus according to claim 5, wherein the filtering unit calculates the filtered sum of the correction amounts by removing a component of impulse signal from the sum of the correction amounts.

7. An image enlarging method comprising:

setting a reference frame from a video image which has a plurality of pixels;

calculating first luminance data for a high resolution video image by interpolating supplementary luminance data based on second luminance data of the reference frame, the number of pixels of the high resolution video image being larger than the video image;

setting target pixels in at least one of frames included in the video image except the reference frame;

calculating corresponding positions to the target pixels in the reference frame with decimal accuracy;

parallelly calculating correction amounts of the first luminance data for the corresponding positions based on the first luminance data, third luminance data of the target pixels, and the corresponding positions;

calculating sum of correction amounts from the correction amounts; and correcting the first luminance data based on the sum of the correction amounts.

8. The method according to claim 7, wherein the step of calculating the sum of the correction amounts includes calculating the sum of the correction amounts based on the correction amounts in the entire of the reference frame.

9. The method according to claim 7, wherein the step of calculating the sum of the correction amounts includes calculating the sum of the correction amounts based on the correction amounts in a partial area that is obtained by dividing the reference frame.

10. The method according to claim 7, wherein the step of calculating the first luminance data includes selecting an image data as the reference frame.

11. The method according to claim 7, further comprising calculating filtered sum of the correction amounts by removing a predetermined component from the sum of the correction amounts, wherein the step of correcting the first luminance data includes using the filtered sum of the correction amounts as the sum of the correction amounts.

12. The method according to claim 11, wherein the step of calculating the filtered sum of the correction amounts includes removing a component of impulse signal from the sum of the correction amounts as the predetermined component.

13. The apparatus according to claim 5, wherein the filtering unit calculates the filtered sum of the correction amounts by removing a component at predetermined area of the first luminance data from the sum of the correction amounts.

* * * * *